United States Patent
Sinibaldi et al.

(10) Patent No.: US 6,338,130 B1
(45) Date of Patent: Jan. 8, 2002

(54) ADAPTIVE METHOD AND APPARATUS FOR ALLOCATION OF DSP RESOURCES IN A COMMUNICATION SYSTEM

(75) Inventors: John C. Sinibaldi, Pompano Beach; Himanshu Parikh, Coconut Creek; Veerbhadra S. Kulkarni, Boca Raton; David A. Frye, Boca Raton; Gary L. Turbeville, Boca Raton, all of FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/267,888

(22) Filed: Mar. 11, 1999

(51) Int. Cl.[7] .............................. G06F 15/82; G06F 9/50; G06F 9/445
(52) U.S. Cl. ........................... 712/35; 712/36; 709/104; 709/102; 709/106; 709/107
(58) Field of Search ............................. 712/32, 33, 34, 712/35, 36; 710/260, 1–6; 370/401, 403, 466, 524, 404, 463, 260, 522; 709/105, 106, 249, 250, 328, 324, 107, 102, 108, 103, 104

(56) References Cited

U.S. PATENT DOCUMENTS

| | | | |
|---|---|---|---|
| 4,991,169 A | | 2/1991 | Davis et al. ................. 370/463 |
| 5,237,686 A | * | 8/1993 | Asano et al. ................ 709/105 |
| 5,291,614 A | * | 3/1994 | Baker et al. .................. 712/35 |
| 5,481,727 A | * | 1/1996 | Asano et al. ................ 711/150 |
| 5,910,970 A | * | 6/1999 | Lu .............................. 375/377 |
| 5,968,158 A | | 10/1999 | Andrews et al. ............ 710/260 |
| 6,138,176 A | * | 10/2000 | McDonald et al. ............ 710/6 |
| 6,178,180 B1 | | 1/2001 | Eng et al. .................... 370/466 |

OTHER PUBLICATIONS

ARTIC960 Modem MUX Mezzanine Card Technical Reference, IBM, Release 1, Version, First Edition, Dec. 1997.
ARTIC960 4–Port Selectrable PMC, Technical Reference, IBM, Release 1, Version 1, First Editon, Nov. 1997.
"SC4000 Universal T imeslot Interchange", VLSI Technology, Inc. Sep. 1996, pp. 6–9.
Mwave Developers Toolkit, "Overview of the Mwave Technology Platform", Intermetrics, Inc., 1993, pp. 1–7.
"Structured Computer Organization", Tanenbaum, A.S., 2$^{nd}$ Edition, Prentice–Halll, Inc., 1984, pp. 336–338.
"Sweet Open Irony", Computer Telephony, Margulies, E., Dec. 1998, pp. 150–151.

* cited by examiner

*Primary Examiner*—Daniel H. Pan
(74) *Attorney, Agent, or Firm*—Jose Gutman; Fleit, Kain, Gibbons, Gutman & Bongini P.L.

(57) ABSTRACT

A communication system (100) includes at least one digital signal processor (DSP) and a WAN driver (80) operating on a processor that is electrically coupled to a memory. The WAN driver (80) receives task allocation requests from a host to open/close communication channels that are handled by the at least one DSP. Each task is allocated to one of the at least one DSP according to a total current task processing load for each of the at least one DSP, a maximum processing capability for each of the at least one DSP, and a processing requirement for each task being allocated to the one of the at least one DSP that can handle the additional processing load of the task being allocated. A configuration controller (92) keeps track of the MIPs processing requirement of each task available for allocation across the plurality of DSPs and the maximum processing capability of each DSP of the plurality of DSPs in response to changes in configuration of the communication system (100).

17 Claims, 16 Drawing Sheets

| | OFFSET | | WORD/BYTES |
|---|---|---|---|
| '80000'x | 8000-81FF | DMUX Area A | (256 / 200x) |
| Streamer BIOS area A | 8200-83FF<br>8400-85FF | STREAMER Area A<br>STREAMER Rx Queue | (256 / 200x)<br>(256 / 200x) |
| | 8600-89FF | ORCA_L2 Area A | (512 / 400x) |
| "8A00'c | 8A00-88FF | DMUX Area B | (256 / 200x) |
| Streamer BIOS area B | 8C00-8EFF<br>8F00-8FFF | STREAMER Area B<br>STREAMER Rx Queue | (256 / 200x)<br>(256 / 200x) |
| | 9000-93ff | ORCA_L2 Area B | (512 / 400x) |
| '9400'x | 9400-95ff | DMUX Area C | (256 / 200x) |
| Streamer BIOS area C | 9600-98FF<br>9900-99FF | STREAMER Area C<br>STREAMER Rx Queue | (256 / 200x)<br>(256 / 200x) |
| | 9A00-9DFF | ORCA_L2 Area C | (512 / 400x) |
| '9E00'x<br><br>User Task Area | 9E00-FFFF | | (GPC's placed at the bottom) |

| Eff. Addr. | |
|---|---|
| 0000-07FF | System Variables (DSEG0=0) MSA 0000.0000-0000.0FFF |
| 0800-0FFF | Streamer BIOS Global area |

| Eff. Addr. | |
|---|---|
| 1000-3FFFF | (DSEG1=0x0000) MSA 0000.1000-0000.7FFF SPIF System Variables DLL Blks, ILL Blks, TRE Q Realtime Task Blks, Non-Realtime Task Blks, |
| 4000-7FFF | TDM Buffers: -TS 00:15 (128w pri.) -TS 16:31 (128w sec.) |

Spare Page (DSEG1=0x00010)
MSA 0001.1000-0001.7FFF
<Eff: 1000-7FFF>
With DSEG1, 0x7000 bytes available.

(DSEG1=0x00010)
MSA 0001.1000-0001.7FFF
<Eff: 8000-FEFF>
With DSEG8, 0x8000 bytes available.

| Eff. Addr. | | |
|---|---|---|
| | (DSEG8=0x0008) MSA 0000.8000-0000.FFFF | (DSEG8=0x0018) MSA 0001.8000-0001.FFFF | (DSEG8=0x0028) MSA 0002.8000-0002.FFFF |
| 8000-89FF | Channel A Area (00) | Channel D Area (03) | Channel G Area (06) |
| 8A00-93FF | Channel B Area (01) | Channel E Area (04) | Channel H Area (07) |
| 9400-9DFF | Channel C Area (02) | Channel F Area (05) | Channel I Area (08) |
| 9E00-FFFF | User Task Area (Page 8) | User Task Area (Page 18) | User Task Area (Page 28) |

| Eff. Addr. | | |
|---|---|---|
| | (DSEG8=0x0038) MSA 0003.8000-0003.FFFF | (DSEG8=0x0020) MSA 0002.0000-0002.7FFF | (DSEG8=0x0030) MSA 0003.0000-0003.7FFF |
| 8000-89FF | Channel J Area (09) | Channel M Area (12) | Channel P Area (15) |
| 8A00-93FF | Channel K Area (10) | Channel N Area (13) | Channel Q Area (16)* |
| 9400-9DFF | Channel L Area (11) | Channel O Area (14) | Channel R Area (17)* |
| 9E00-FFFF | User Task Area (Page 38) | User Task Area (Page 20) | User Task Area* (Page 30) |

LOAD TABLE

|  | CHANNEL 1 | CHANNEL 2 | ----- | CHANNEL MAX | TOTAL UTILIZATION $\Sigma_M i$ |
|---|---|---|---|---|---|
| $DSP_0$ | $M_{SS7}$ | $M_{GSM}$ | ∅ | $M_{GSM}$ | $M_{SS7} + M_{GSM} + M_{GSM}$ |
| $DSP_1$ | $M_{HDLC}$ | $M_{HDLC}$ | $M_{HDLC}$ | ∅ | $H_{DLC} + M_{HDLC} + M_{HDLC}$ |
| ⋮ |  |  |  |  |  |
| $DSP_{MAX}$ | ∅ | ∅ | ∅ | ∅ | ∅ |

∅ = IDLE CHANNEL
$M_{SS7}$ = NUMBER OF MIPs REQUIRED FOR SS7 PROTOCOL
$M_{GSM}$ = NUMBER OF MIPs REQUIRED FOR GSM PROTOCOL
$M_{HDLC}$ = NUMBER OF MIPs REQUIRED FOR HDLS PROTOCOL
$\Sigma Mi$ = SUM OF ALL CURRENT TASK MIPS ON $i^{th}$ DSP

*FIG. 12*

MIP PER TASK

| TASK | MIP PROCESSING REQUIRED |  |  |  |
|---|---|---|---|---|
| $M_{HDLC}$ | 1 MIP |  |  |  |
| $M_{SS7}$ | 2 MIP |  |  |  |
| $M_{GSM}$ | 5 MIP |  |  |  |
| $M_{G.727}$ | 22 MIP |  |  |  |
| $M_{G.729}$ | 20 MIP |  |  |  |

*FIG. 13*

DSP MAX MIP CAPABILITY

|  |  |  |  |  |
|---|---|---|---|---|
| $DSP_0$ | 50 MIP |  |  |  |
| $DSP_1$ | 50 MIP |  |  |  |
| ⋮ |  |  |  |  |
| $DSP_{MAX}$ | 25 MIP |  |  |  |

*FIG. 14*

ADAPTIVE METHOD AND APPARATUS FOR ALLOCATION OF DSP RESOURCES IN A COMMUNICATION SYSTEM

BACKGROUND OF THE INVENTION

1. Field of the Invention

This invention relates in general to communications processing systems, and more particularly to digital signal processor ("DSP") based communications cards.

2. Description of the Prior Art

This application deals with technology related to that in U.S. patent application Ser. No. 08/944,209, filed on Oct. 6, 1997, now U.S. Pat. No. 5,968,158. That application is entitled "A DSP-based, Multi-bus, Multiplexing Communications Adapter," has a common assignee with the present invention, and its disclosure is incorporated herein by reference. That co-pending application describes a pair of communications adapters, which each includes a number of DSPs and network interface circuits for the attachment of a multi-channel telephone line. A bus connecting the communications adapters can carry data between a network line attached to one of the adapters and the DSPs of the other adapter. The DSPs on each card are connected to a host, or controller, processor. Each DSP interrupts its host processor by transmitting an interrupt control block as data to a data memory of the host processor, and by subsequently sending an interrupt causing the host processor to examine the data memory. Preferably, the interrupt control block includes data representing a number of requested interrupts.

This application deals with technology that is also related to that in U.S. patent application Ser. No. 08/979,531, filed Nov. 26, 1997, now U.S. Pat. No. 6,178,180. That application is entitled "Communications Adapter for Processing ATM and ISDN Data," has a common assignee with the present invention, and its disclosure is incorporated herein by reference. That co-pending application describes a pair of communications adapters, which each include a network interface and a signal processing means. Each adapter can process data in either integrated Services Digital Network ("ISDN") format or Asynchronous Transfer Mode ("ATM") format. Each signal processing means preferably includes a pair of DSPs.

In the known prior art, DSP Adapters for communications applications, such as for telephone communications, typically have utilized custom hardware and firmware that may require significant modifications in hardware and firmware to implement changes in communication protocols, data types, and other changes in operational parameters. Interfaces to these DSP Adapters have not been very flexible to adapt to these changes as may be necessary for new applications.

Accordingly, there is a need for a method and apparatus for increasing the flexibility of interfaces of DSP Adapters for varying applications and for overcoming the limitations in the prior art.

BRIEF DESCRIPTION OF THE DRAWINGS

FIG. 9 is a diagram showing part of the DSP memory layout.

FIG. 10 is a diagram showing part of the DSP memory layout and the paging structure.

FIGS. 12, 13, and 14, are diagrams illustrating first, second, and third tables, respectively, located in a memory according to a preferred embodiment of the present invention.

DESCRIPTION OF A PREFERRED EMBODIMENT

1. Overview

Figure 1:
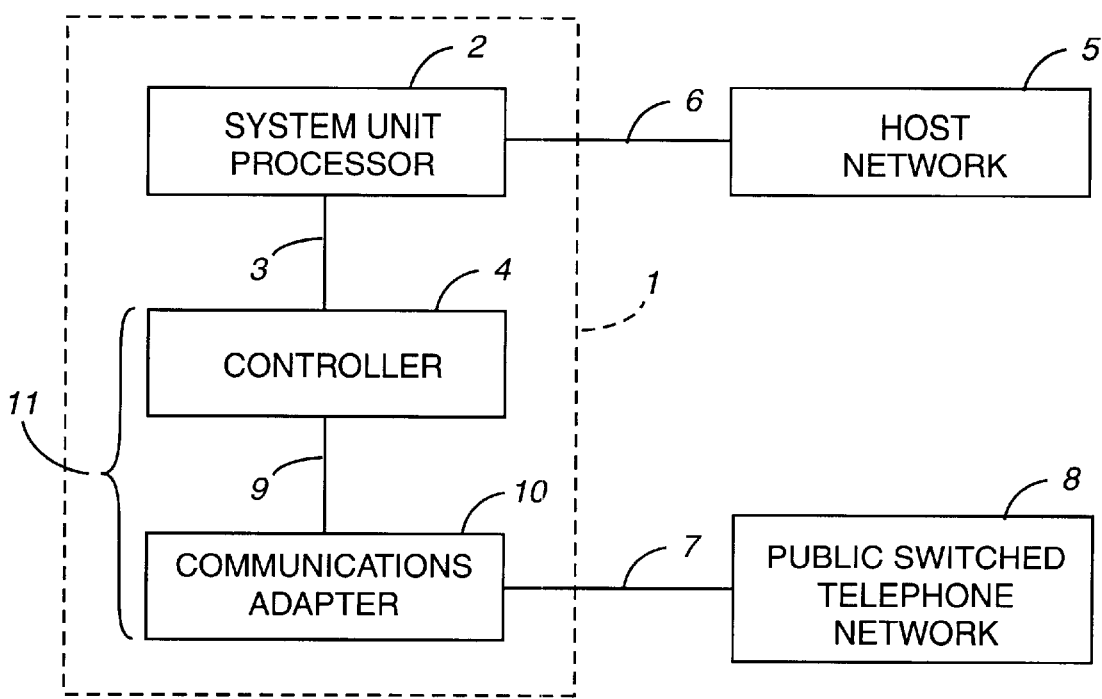
FIG. 1 is a high-level block diagram of a communications system according to the present invention.

The disclosure provides a DSP based communications adapter card for supporting a wide variety of communications standards and applications. Referring to FIG. 1, a communication system 100 is shown according to the preferred embodiment comprising an adapter card 10 configured as a daughter card to a controller card 4. Applications that the preferred embodiment either currently supports or could be configured to support include, but are certainly not limited to, (i) a directory assistance system, (ii) voice over data ("VOD") using the voice compression standard Global System for Mobile communication ("GSM"), an ETSI standard, (iii) voice over IP, where Internet voice could be used, (iv) a multi-channel ISDN adapter, (v) multi-channel Signaling System No. 7 ("SS7") adapter, (vi) Dual Tone Multi-Frequency ("DTMF"), for example the tones on a push-button telephone, (vii) conferencing, (viii) interactive voice response ("IVR"), (ix) LAP-B protocol applications, and (x) frame relay applications. The applications use a Signal Computing System Architecture ("SCSA") time division multiplexed ("TDM") time slot interface to communicate with external devices and a Peripheral Component Interconnect ("PCI") bus to communicate with the controller card 4.

The disclosure also provides an interface between the DSP based communications adapter card 10 and the system unit. The system could be based on AIX, OS/2, Windows NT, Novell, etc. The interface can support a wide variety of DSP based communications adapter cards, and provides the same system-level application programmer's interface ("API") for each adapter card while only needing to modify the module that interacts directly with the hardware on the adapter cards. This interface is referred to, in the disclosure, as a wide area network device driver ("WAN driver 80"). The interface uses a Unix based Streams interface to the system level processor.

2. General Description of Hardware Configuration

FIG. 1 is a schematic view of, amongst other things, a server application system 1 using a communications adapter 10. The computer system 1 includes a system unit processor 2 having a Peripheral Component Interconnect ("PCI") bus 3 extending to a controller 4. Data is transferred between a host network 5, such as a database service network, and the computer system 1 over a Local Area Network ("LAN") 6, or other connection. Also connected to the computer system 1 is a Time-Division Multiplexed ("TDM") network line 7, which extends to the public switched telephone network 8. The TDM network line 7 is, for example, a T1 line in the United States or an E1 line in Europe.

In North America, the Primary Rate Interface ("PRI") version of Integrated Services Digital Network ("ISDN") service provides 23 Bearer ("B") channels at 64 kbps and a single D channel, also at 64 kbps. In Europe, this version provides 30 B channels and a single D channel. User information is carried on the B channels, with the D channel being used for call control. In North America, this service is provided along a T1 transmission line, while in Europe, this service is provided along an E1 transmission line. The various channels are combined for transmission along a single wire by means of TDM, with the channels being given fixed-length frames, or segments, of transmission time in a sequential fashion. Using ISDN, a computing system can place and receive calls over the pubic switched telephone network to a different client device on each channel, or to another device configured to transmit and receive ISDN data.

In the computing system 1, the TDM network line 7 is connected to a communications adapter card 10. A single subsystem 11 consists of a single card pair, with a communications adapter card 10 plugged into a controller card 4 using a PCI Mezzanine Card to PCI ("PMC-PCI") bus as the interface 9. Such a single card pair subsystem 11 can handle 30 ISDN B channels, making use of the full ISDN B channel bandwidth of 64 Kbps (kilobits per second) while communicating with remote digital devices. Alternatively, a single card pair subsystem 11 can provide for 15 connections to remote analog modems at data rates up to 56 Kbps when communicating with remote analog modems. The actual number of channels which can be connected in this way may vary somewhat from these numbers, depending on the characteristics and limitations of the public switched telephone network 8 as well as on the capabilities of the subsystem 11. The computing system 1 may be, for example, an IBM 7588 industrial computer, having a PCI bus 3 which can be connected to multiple subsystems 11, each of which is connected through a TDM network line 7 to a separate ISDN network. The adapter card 10 may be used to process, for example, data signals, voice signals requiring speech synthesis or speech recognition, or video signals in a videoconferencing application.

Figure 2:
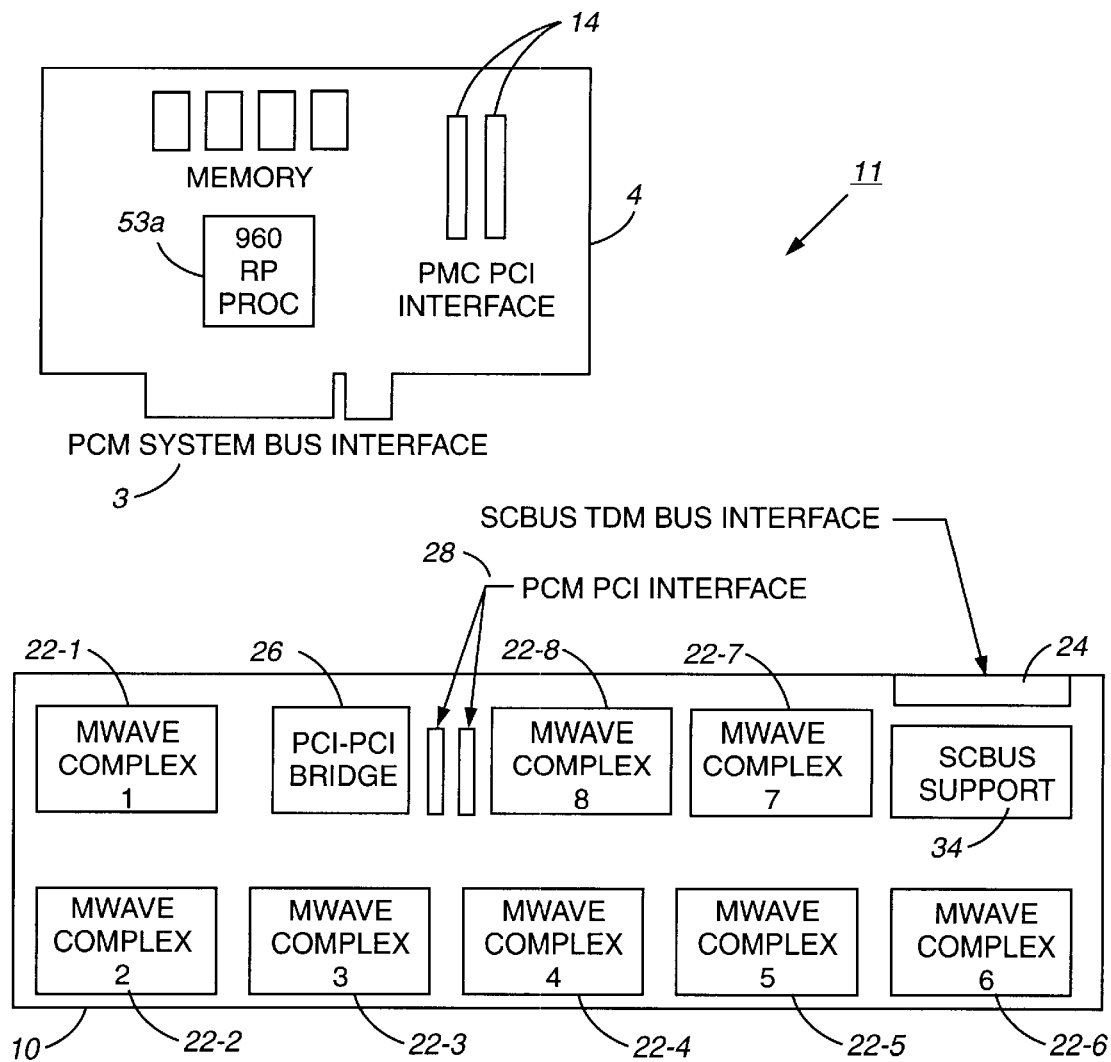
FIG. 2 is a block diagram of a controller card and a communications adapter card according to the present invention.

FIG. 2 is a diagrammatic view of a single card pair subsystem 11. The communications adapter card 10 includes eight digital signal processor ("ADSP") systems 22-1 through 22-8, referred to as MWave Complex 1 22-1 through MWave Complex 8 22-8, together with provisions for bus connections through an SC-bus interface 24, to which the TDM network line 7 (shown in FIG. 1) is connected, and a PCI—PCI Bridge 26 with a PMC-PCI interface 28, by which the communications card 10 is connected as a daughter card to the PMC-PCI Interface 14 of the controller card 4. Other major components are included in the module marked SC-bus Support 34. This module supports the SC-bus interface 24, which is configured according to Signal Computing System Architecture ("SCSA") requirements.

The controller card 4 is, for example, an IBM PCI-960 Base Controller. Each controller card 4 fits into a card slot of a personal computer supporting a PCI bus 3, referring to FIG. 1. The PCI bus connection is made between the system unit 2 and the controller card 4 through the PCI System Bus Interface 3.

Figure 3:
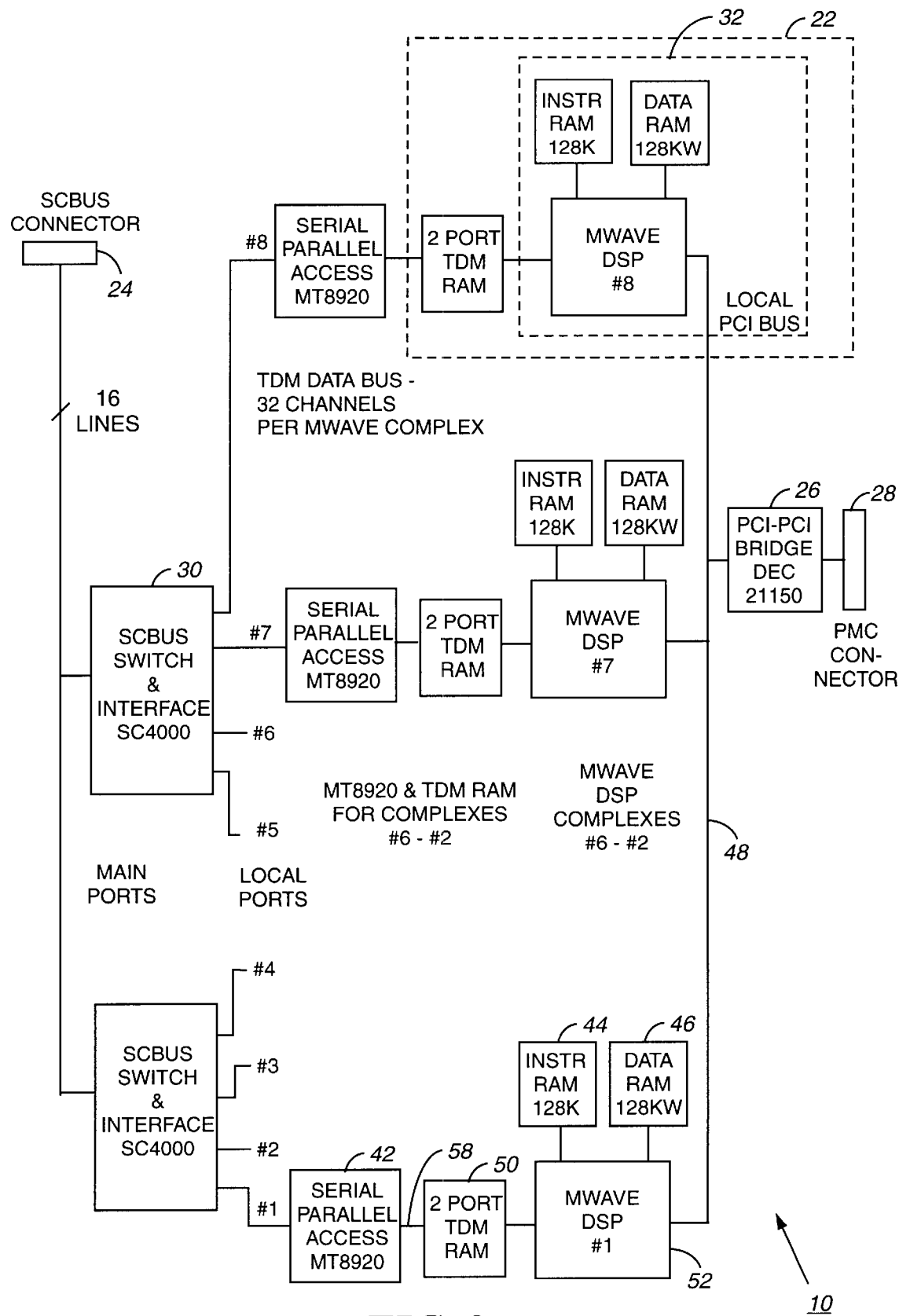
FIG. 3 is a more detailed block diagram of the communications adapter card showing the interconnections between various components.

FIG. 3 is a more detailed functional block diagram of the communications adapter card 10. Each DSP system 22, or MWave Complex, of FIG. 2 comprises in FIG. 3 a DSP subsystem 32 and a RAM 50. Each DSP subsystem 32 is connected to a PCI bus 48 extending along the card 10, and to a two-port data RAM 50 which is provided as a transmit/receive buffer for the corresponding DSP subsystem 32. Each DSP subsystem 32 includes a DSP module 52, for example an MWAVE 3780P module, a 128K×24 instruction storage 44, and a 128K×16 data storage 46. Each 2-port data RAM 50 is a 1 K×8 high-speed static RAM device, such as a Cypress CY7C131 memory module. The PCI bus 48 is connected through the PCI—PCI Bridge circuit 26 to the PMC-PCI connector 28. The PCI bus 48 is a synchronous 32-bit I/O interface running at 33 MHZ. The PMC-PCI connector 28 is connected to the PMC-PCI Interface 14 of the controller card 4 (see FIG. 2) through a PCI bus. All interrupt functions between the DSP subsystems 32 and the controller card 4 are controlled by a processor 53a of the controller card 4, for example an Intel 80960 processor.

The PCI—PCI bridge circuit 26 electrically isolates the PCI bus 48 from the PCI bus on the controller card 4 and provides arbitration for the eight DSP subsystems 32 as they request busmaster service. This bridge circuit 26, may be, for example, a DEC 21150 PCI—PCI Bridge chip, which can handle up to nine devices. The bridge circuit 26 includes a memory space which is divided into standard bridge configuration registers and device-specific configuration registers. The device-specific registers, which are not needed for standard implementations between PCI busses, are not programmed for this application. The standard configuration registers are controlled by the kernel of the controller card processor 53a (see FIG. 2).

The 2-port data RAM devices 50 are each individually connected through an 8-bit data channel 58 to a serial to parallel TDM interface chip 42, which may be, for example, a Mitel MT8920B interface chip. The interface chips 42 are in turn connected to the SC-bus switch 30, which may be, for example, a VLSI SC4000 interface chip. The SCSA TDM bus ("SC bus") is implemented with two SC-4000 universal timeslot interchange chips (VLSI Technology, Inc.). This bus switch 30 is in turn connected to the SC-bus connector 24. The SC-bus Support 34 of FIG. 1 comprises the serial to parallel TDM interface chips 42 and the SC-bus switch 30 of FIG. 3.

Each SC-4000 30 contains eight uni-directional ports in addition to the main SC bus ports, for a total of 16 unidirectional ports in the preferred embodiment. The preferred embodiment supports 16 lines (or wires, or ports), which can be configured, for example, as 8 transmit lines and 8 receive lines, for 8 full-duplex connections. Each full-duplex connection is shown as a single connection to each serial-to-parallel chip 42 in FIG. 3. These SC bus ports may be programmed at one of three speeds via the SC-4000 chips. Only two of the speeds are supported by the preferred embodiment's main SC bus, namely the 2.048 MBPS (with 32 timeslots per frame, at 64 kilobits per second ("KBPS") per timeslot) and 4.096 MBPS speeds (with 64 timeslots per frame, at 64 KBPS per timeslot)—8.192 MBPS (with 128 timeslots per frame) is not supported. The main SC bus refers to the bus between the SC-4000 30 and the SC bus connector 24, and the main SC-4000 ports refer to the ports connected to the main SC bus. The local SC bus and the local SC-4000 ports refer to the bus and ports which are connected to the serial/parallel access chips 42. Only the 2.048 MPBS speed is supported by the local SC bus ports.

The SC bus architecture standard allows for assignment of the timeslots to be either transmit or receive. However, the preferred embodiment limits them to be half transmit and half receive. With the main SC bus port programmed at 4.096 MBPS, there are 1024 timeslots (or channels) (16 lines×64 timeslots each equals 1024 timeslots). With the local SC bus ports programmed at 2.048 MBPS, there are 512 timeslots being used (16 lines×32 timeslots each). In such a case, 512 of the total of 1024 timeslots (512 transmit and 512 receive) may be selected for use by the DSPs. Therefore, a timeslot will be defined as 64 KBPS, eight bits at a time, TDM, either transmit or receive. This is in keeping with the SC-4000 chip convention (VLSI Technology, Inc.). Each DSP may have 64 timeslots selected, 32 transmit and 32 receive, for a maximum of 32 full-duplex channels. The preferred embodiment has eight (8) MWAVE DSP chips running at 44 million instructions per second ("MIPS") each and is capable of transmitting and receiving on the selected 64 unidirectional timeslots.

The communications adapter card 10 supports an SCSA interface at its top edge (see FIG. 2) along a 26-pin connector 24. This interface has the capability of eight full-duplex T1 or E1 network lines. The adapter card 10 may be connected to a line card such as the four (4) port E1/T1 Quad Card ("DTQA") or ARTIC960 4-Port T1/E1 Mezzanine Card (ORCA) via the SCSA bus. SCSA is a standardized TDM bus interface for intercard communication and was created for use in telephony systems.

3. General Description of Timing and Data Flow

The SC-bus switch 30 is the main clock source for all TDM clock functions and it generates all main SC-bus clocks and all of the local port clocks. The local ports have a 4.096-MHZ bit clock and an 8-KHz frame sync clock, which are supplied to the serial to parallel interface 42.

The serial to parallel interface chips 42 provide the connection between the SC-bus switch 30 and one port of each of the eight two-port 1 K×8 RAM buffers 50. Serial transmit and receive data between the serial to parallel interface chip 42 and the SC-bus 30 is clocked at an E1 line speed of 2.048 Mbits per frame and 8000 frames per second. Data is shifted into one buffer 50 and out of another buffer 50 in full duplex mode. Separate transmit and receive 2-port RAM buffers (not shown) within the serial to parallel interface chip 42 each have one port tied to a separate serial port 63, while the other port of both these buffers is tied to a common parallel port 63a. One byte of transmit data is read from the transmit buffer RAM one channel time before it is shifted out the serial port 63 of this chip 42, and one byte of receive data is written to the receive buffer RAM one channel time after it is shifted in from the serial port 63. The parallel bus 58 extending between the parallel interface chip 42 and the RAM buffers 50 provides an 8-bit data bus and a 5-bit address bus, a WRITE ENABLE pulse, and a READ ENABLE pulse. This interface allows direct connection of the eight RAM buffers 50, being timed to read one byte and write one byte of parallel data as the serial interface from the serial to parallel interface chip 42 is shifting four bits in or out.

The parallel interface port 63a writes all 32 channels of receive data for every frame into all eight two-port RAM buffers 50 simultaneously. In this way, all eight DSP subsystems 32 have access to all received data. On the other hand, parallel transmit data is read from the transmit portion of a single two-port RAM buffer 50 at a time into the parallel interface port 63a.

Each 2-port static RAM buffer 50, being divided into transmit and receive buffers (not shown), stores eight consecutive frames of data to be transmitted or received. All 32 channels for each frame are allocated for both transmit and receive buffers. Each DSP subsystem 32 can access 256 bytes of receive buffer data and 256 bytes of transmit buffer data. The serial to parallel interface 42 requires a dedicated port to each of these buffers continuously. A 3-bit frame counter function is implemented in circuits associated with the DSP subsystem 32-0. These three bits, together with the five address bit driven along bus 58 from the serial to parallel interface 42, provide for the selection which must be made among the transmit and receive buffers within the RAM buffers 50. The serial to parallel interface 42 can only read from the transmit buffers within the RAM buffers 50 and can only write to the receive buffers therein. All eight receive buffers are written simultaneously, but only one transmit buffer is read at a time.

The other, opposite port of each two-port RAM buffer 50 is dedicated to an associated DSP subsystem 32, which can only write to the transmit buffer within the RAM buffer 50 and read from the receive buffer therein.

Thus, referring to FIGS. 1 and 3, data received from the transmission line 7 moves as serial data from the SC-bus switch 30 and outward from the LOCAL PORT 1 of this switch 30 to the serial to parallel interface 42, where it is converted into a parallel format, in which it is carried into the RAM buffers 50. Data from these buffers 50 then flows through the associated DSP subsystems 32 to the internal PCI bus 48, and into the controller 4 through PCI bus 53.

Data to be transmitted on the transmission line 7 flows into the communications adapter through PCI bus 53 and through PCI bus 48 to the DSP subsystems 32. This data is then written into the associated RAM buffers 50, to be sent therefrom, in a parallel format, along the 8-bit data bus 58, to the serial to parallel interface 42. The SC-bus switch 30 can then direct data received through LOCAL PORT 1 from the serial to parallel interface 42 outward through the SC-bus connector 24 to be transmitted from a network line 7 connected to the communications adapter 10.

The DSP module 52 drives the static RAM buffer 50 with its 16-bit GPIO port and with an external 8-bit address latch module. The control code executing in DSP module 52 can only write to the transmit buffer area in RAM buffer 50, and can only read from the receive buffer area in this buffer 50. The sixteen bits of the GPIO port of each DSP module 52 can be programmed to be input only, output only, or bidirectional. A single DSP instruction can change the polarity of output bits, read the current state of the 16 bits, or tri-state a set of bits. Since only a single function can be performed with each DSP instruction, it requires a series of instructions to perform a timed sequence controlling an external device. In the communications adapter card 10, nine DSP instructions are required to read and write a single address in the two-port RAM buffer 50.

The MWAVE 3780P module 52 contains a 44 MIP ISP-5.6 DSP core which can access 128K of 24-bit instructions and 128K of 16-bit data storage. This module is a multifunction device containing PCI functions for DSP, UART, MIDI, Soundblaster, Soundblaster DMA Controller, and three PBUS parallel devices. In the example of the present implementation, only the DSP device is configured for the PCI interface. There are three additional serial I/O ports available from each MWAVE module 52, but they are left unconnected, as they are not used. All of these additional peripheral interfaces and unused device functions are disabled and powered down through peripheral control and power management registers to minimize power consumption and to avoid resource conflicts.

Each DSP module 52 uses an internal clock generator driven by an external 33.8688 MHZ oscillator. This internal PLL (Phase-Locked Loop) clock generator is programmable, allowing instruction cycle rates from a minimum of 17 MIPs to a maximum of 44 MIPs. In the example of the present implementation, all DSP modules 52 are set to run at 44 MIPs.

4. Description of Interrupts from the Adapter Card to the Controller Processor

The Adapter card provides interrupt signals to the WAN Driver 80 on the Controller Processor card.

5. General Description of Functionality

The adapter card 10 and the WAN driver 80 operate in cooperation in the preferred embodiment. The WAN driver 80 operates on the controller card 4, for example the ARCTIC 960 product from International Business Machines ("IBM"), and drives the adapter card 10, for example the SPN256 product from IBM. The preferred embodiment has the following features, each of which will be explained for the adapter card 10 and the WAN driver 80.

A. Timeslot Routine/channel Port Assignment

Scatter/Gather

Because the SCSA bus is a TDM bus, the information from each receive channel must be pulled off or accepted at intervals, and the information delivered to each transmit channel must be interleaved in the outgoing frames. This operation is referred to as scattering, for transmission, and as gathering, for reception.

Loopback

The preferred embodiment implements several loopbacks for diagnostic purposes. These can be illustrated by referring to FIG. 4. Loopbacks have been built into the preferred embodiment in the Streamer Task 70, the Scatter/Gather 72, and the SC bus switch 30 (see FIG. 3).

Inter-DSP Communication

As stated earlier, the SC bus switch and interface chip 30, the SC-4000, can be configured to connect the channels on the main ports (see FIG. 3) to the various DSP complexes 22 through the serial-parallel access chips 42. The SC bus switch 30 can also be used to connect two of its local ports. This enables inter-DSP communication, and is also how a loopback, mentioned above, is achieved.

Conferencing

The inter-DSP communication can support a conferencing application by providing a mechanism for the DSPs to coordinate and control a plurality of channels associated with a conference. A plurality of TDM communication channels can be selectively mixed (summed) into a composite communication channel signal that represents a sum of voice signals for conferencing between the plurality of channels.

B. Streams Interface

Mgmt. Streams and Text Streams

The WAN driver 80 and the adapter card 10 communicate with each other using a Unix based Streams interface. A management stream can be established and used to configure the application module and its parameters, such as block size, etc. A data transfer stream can also be established, and it is used to transfer data in prescribed block sizes.

Bundling Sizes

The block size, or bundle size, can be dynamically configured, depending on the application being used and the memory available. There is a tradeoff between block size and total processor overhead; the larger the block size, the less the overhead that is required per byte transferred. The WAN driver 80 automatically breaks up data into bundles of data. The WAN Driver 80 adapts to the varying data requirement versus latency of data transmission to the DSP Resource Adapter 10. Small bundles have less latency delay, while large bundles have larger latency delay and require larger amount of memory. This provides a means for adaptively bundling the transferred data via a data transfer interface to support at least one data format from a set of data formats including voice data, fax data, and computing data. The bundles of data are processed by at least one DSP in the Adapter card 10. After processing, TDM data corresponding to the bundled data is communicated via a TDM interface and bus.

The software on the DSP will also bundle messages that have been received over the SC bus that are larger than the block size that was selected. The DSP simply includes an indicator that another block needs to be sent. The WAN driver 80 interprets this indicator and knows to expect at least one more block. At the end of the last block, the DSP verifies the check sum. The bundles can be smaller than the maximum block size. However, fixed length blocks can also be configured. It is common for voice applications such as voice over IP to use these fixed length blocks.

For transmission of information from the WAN driver 80 to the DSP, the WAN driver 80 can simply give the DSP a pointer to the first block of memory, in the 960 processor on the controller card 4, where the data is located. The DSP is then able to retrieve all of the data. In transmission as well as reception, the block sizes are configurable according to the needs of the application running on the DSP.

PCB, RCB, TCB

Data is typically sent between the WAN driver 80 and the DSPs using defined blocks. A protocol control block ("PCB") is used in a management stream to send configuration and protocol setup information. A transmit control block is used to send data, which needs to be transmitted by the DSP, from the WAN driver 80 to the DSP. Similarly, a receive control block is used to send data, which has been received by a DSP, from the DSP to the WAN driver 80.

Streamer BIOS

The Streamer BIOS handles the interface for a Streams communication via a bus interface with a host computing system. The host computing system can be implemented on an operating system platform, such as using a Unix operating system or other multi-tasking operating system. The Streams BIOS operates with a co-processor and associated memory. A WAN Driver 80 coupled to the Streams BIOS provides communication with the S.P.I.F. 82 operating system on the DSP adapter card 10.

TDM Interface

TDM BIOS

Figure 4:
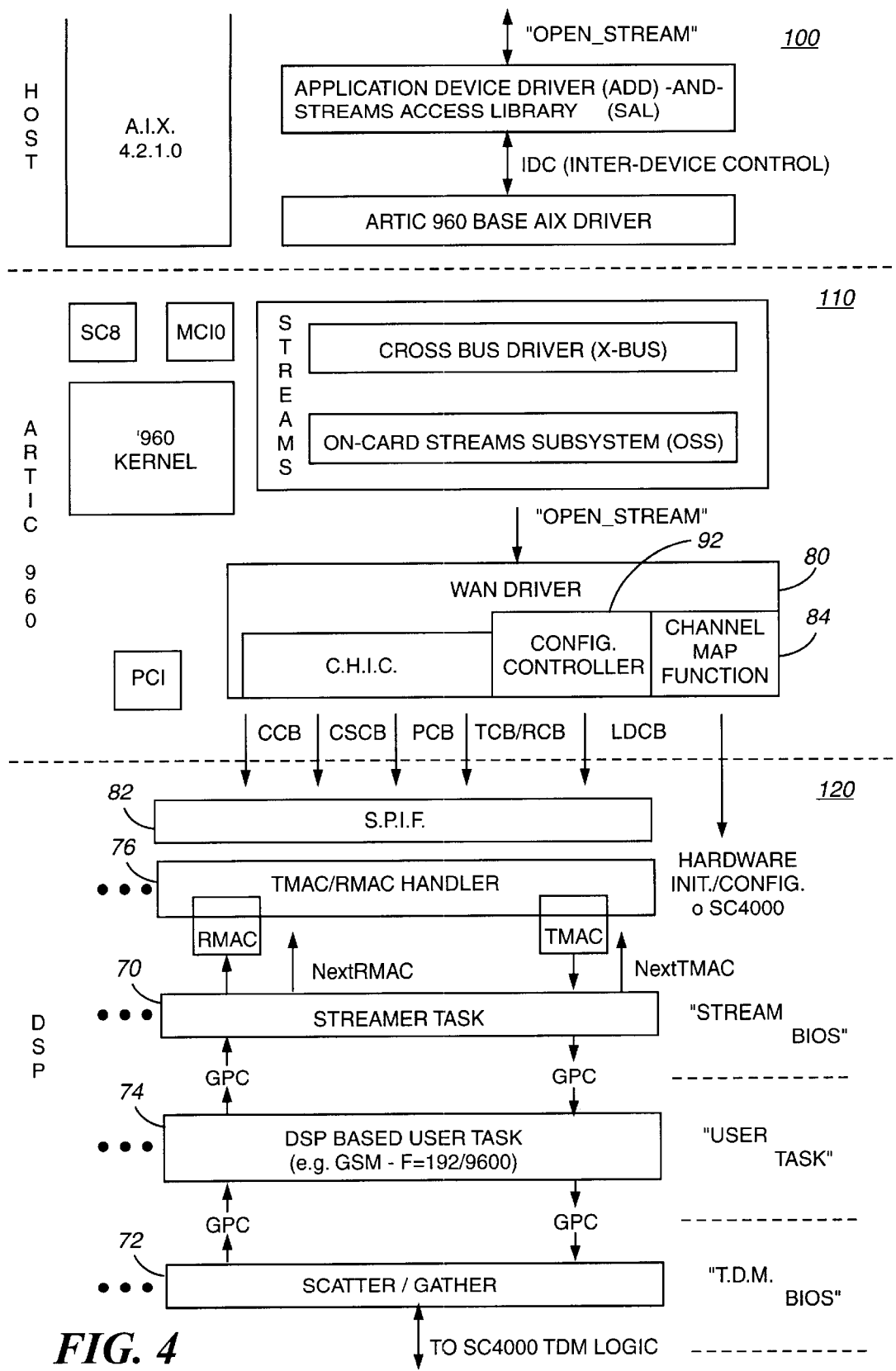
FIG. 4 is a block diagram showing interoperation of functional components of the communications system of FIG. 1 according to the present invention.

Referring to FIGS. 3 and 4, the interface between the DSP Based User Task 74 and the SC bus switch 30 is handled by the TDM BIOS. The TDM BIOS provides many services similar to a standard Basic Input Output Service, and is tailored for interfacing with a TDM interface on the adapter card, and is stored in memory on the adapter card 10.

C. Communication Hardware Interface Control ("CHIC")

The CHIC is an interface between the API and the adapter card 10. It is that portion of the WAN driver 80 that is tailored to the hardware on the adapter card 10. This further isolates the API from the adapter card. The adapter card need only be PCI compliant, then, to be supported by the WAN driver's API interface. The preferred embodiment of the adapter card can host a variety of applications. The CHIC enables the WAN driver 80 to be modified easily in order to support additional, different, adapter cards which may support the same or different applications as the preferred embodiment.

The functions which the CHIC performs on the preferred embodiment include loading the DSP with code and data, providing support to the control block handler (explained below), and providing support to the interrupt handler (also explained below). The CHIC sends the load commands, the PCBs, and the TCBs to the DSPs, and receives the RCBs from the DSPs.

D. Additional Adapter Card Features

JSPOS

The preferred embodiment uses its own proprietary operating system, called JSPOS. It is a real time multi-tasking operating system that handles tasks for the at least one DSP operating in the communications adapter 10. A plurality of application tasks can be scheduled to operate on each of the at least one DSP.

Page Based Memory Layout

The MWAVE DSP allows for expanded memory using paging, and provides its own operating system to control the paging. The preferred embodiment does not use the MWAVE operating system, however, and instead uses JSPOS.

6. Detailed Description of Functionality

A. Adapter Card Firmware Layout

Streamer BIOS

The Streamer BIOS contains a Streamer Task 70 that is scheduled in a time division multiplexing fashion. For example, as shown, scheduling is set at frame time 192 with a 9600 Hz schedule interrupt (F=192/9600 or F=160/8000). This task processes "streams" of data. The data is not framed, however, and should not be confused with Unix Streams.

Layer 2 Interface to Streamer Task

The TMAC-to-TCB/RMAC-to-RCB Handler 76 will refer to the task that runs on top of the Streamer Task. Each transmit media access control ("TMAC") block and receive media access control ("RMAC") block will be associated with a bundle of data.

Note that each bundle will be associated with a receive control block ("RCB") or a transmit control block ("TCB"). The RCB and TCB control blocks are used as the interface between the WAN driver 80 and DSP firmware. The TMAC-to-TCB/RMAC-to-RCB Handler code 76 will convert the TCB to TMAC for processing by the Streamer and convert every RMAC to RCB for processing by the WAN driver 80.

For example, the Bundle Size may be set to 17 decimal Words (34 bytes), at some point in processing, while it may be increased to reduce the processing load on the ARCTIC 960 adapter (Co-Processor) 53a at a later point in processing.

For streaming data applications (such as voice), there is no frame. You could also say the frame has infinite length (never ends). So, the Max Frame Size passed from the WAN driver 80 to the 'Streamer DSP Task' will not be utilized. For framed ISDN applications each frame of data will be associated with an RCB or TCB. When the frame size increases beyond the bundle size the frame is broken up into bundles for DMA to/from the DSP memory from/to the Co-Processor memory 53a.

TMAC-to-TCB/RMAC-to-RCB Handler (ORCAL2)

The TMAC-to-TCB/RMAC-to-RCB Handler task will work with the Streamer task using the generic bundling mechanism. A version of the TMAC-to-TCB/RMAC-to-RCB Handler task will be used with the SPN256 streamer BIOS. A summary of changes can be made via configuration for operation in either ISDN or Voice mode. They are as follows:

Reduce the number of RMACs and TMACs to 4 each.

Global tables changed to run only 3 channels per DSRB page.

Remove the use of Trace area.

User Interface to TDM BIOS The TDM interface on SPN256 will consist of 64 circular buffers, each of 256 samples in size, packed into 128 Word contiguous block of Data RAM. There is a 128 word block for transmit and a 128 word block for receive for each of the 32 possible bidirectional timeslots. There will be a dedicated '4000'x byte area to hold these buffers.

Figure 5:
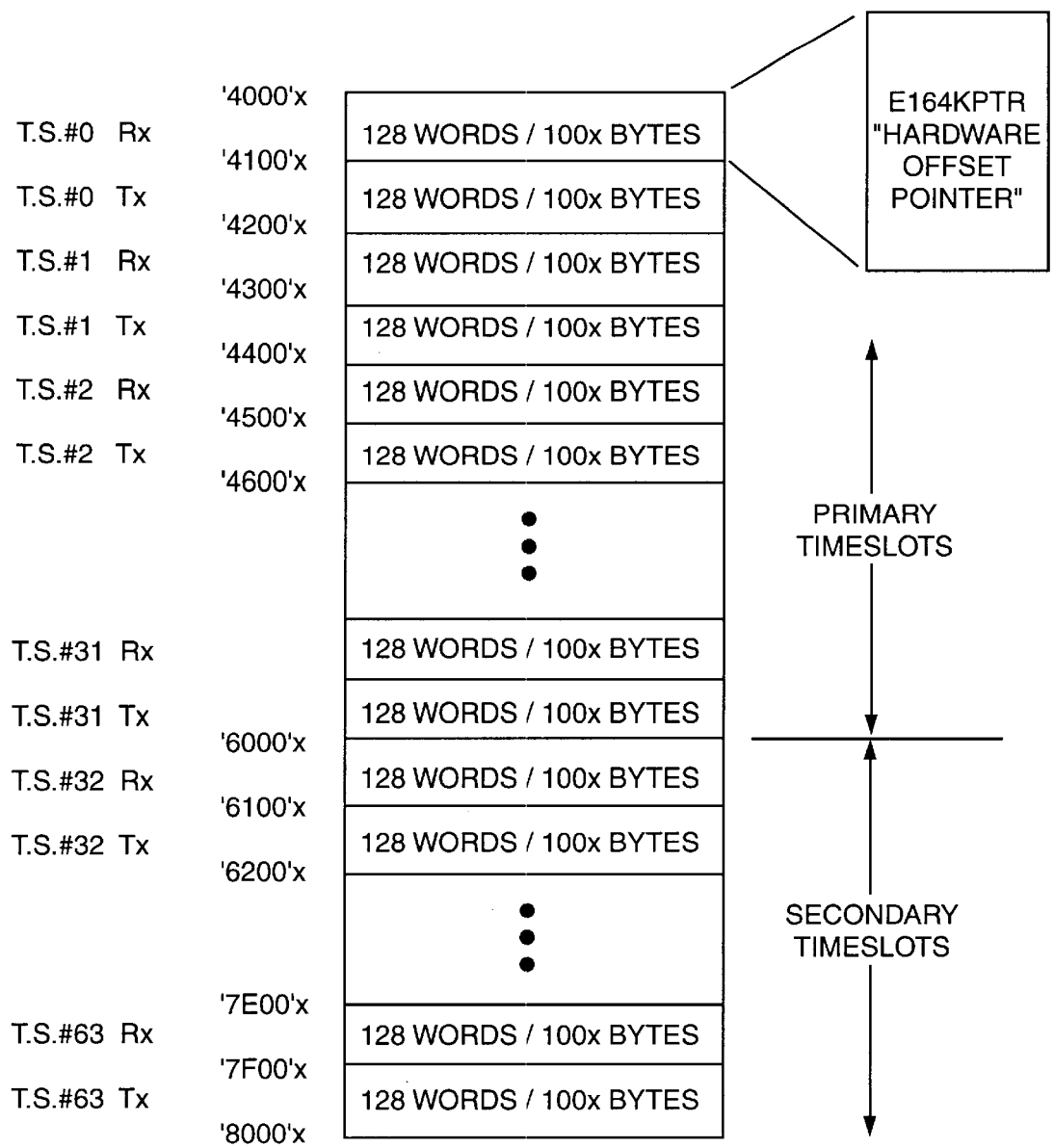
FIG. 5 is a memory map showing part of the interface to the TDM BIOS of FIG. 4.

The Global Variable E164KPTR will contain in the low order 8 bits an 8-bit pointer offset that is used to indicate the current position of the Scatter/Gather task access pointer into each of the Circular buffers. This is shown in FIG. 5. The upper 8-bits are zero. This byte offset will be in the range '00'x to 'FE'x. The same offset is used for both the transmit and receive buffers. The value is always even since the real-time data processing (moving) task updates this offset. (It always processes an even number of bytes at a time.) The user must be sure to use a "fresh" copy of the offset whenever it is needed for pointer initialization.

User Task Initialization

After the Streamer BIOS initialization is complete, it will call the initialization entry point, such as GSM_INIT. This initialization code should return to the caller. The return address will be passed in R7. The Streamer BIOS will also pass this channel's DMUX pointer in register R4.

The GSM user task, in this example, is responsible for scheduling its sub-components at the proper rate, as well as initializing all channelized variables. Also, all necessary general purpose connectors ("GPCs") should be connected. An exemplary operational sequence would be as follows:

1. A PCB is issued by the WAN driver 80 on the ARTIC960 PCI Coprocessor adapter to enable this channel.
2. Streamer Initialization is called JDAFINIT(JDFFINIT) invoking the Streamer Standby State (MACSTBY).
3. This Streamer Standby State initializes the interface GPC pointers, schedule the streamer main task (MACMAIN), and then calls the USER Task initialization routine.
4. For the GSM task an initialization routine would operate from GSM_INIT.

Bundling Interface Header/Trailer for TMAC/RMAC Buffers

TMAC Buffer

Figure 6:
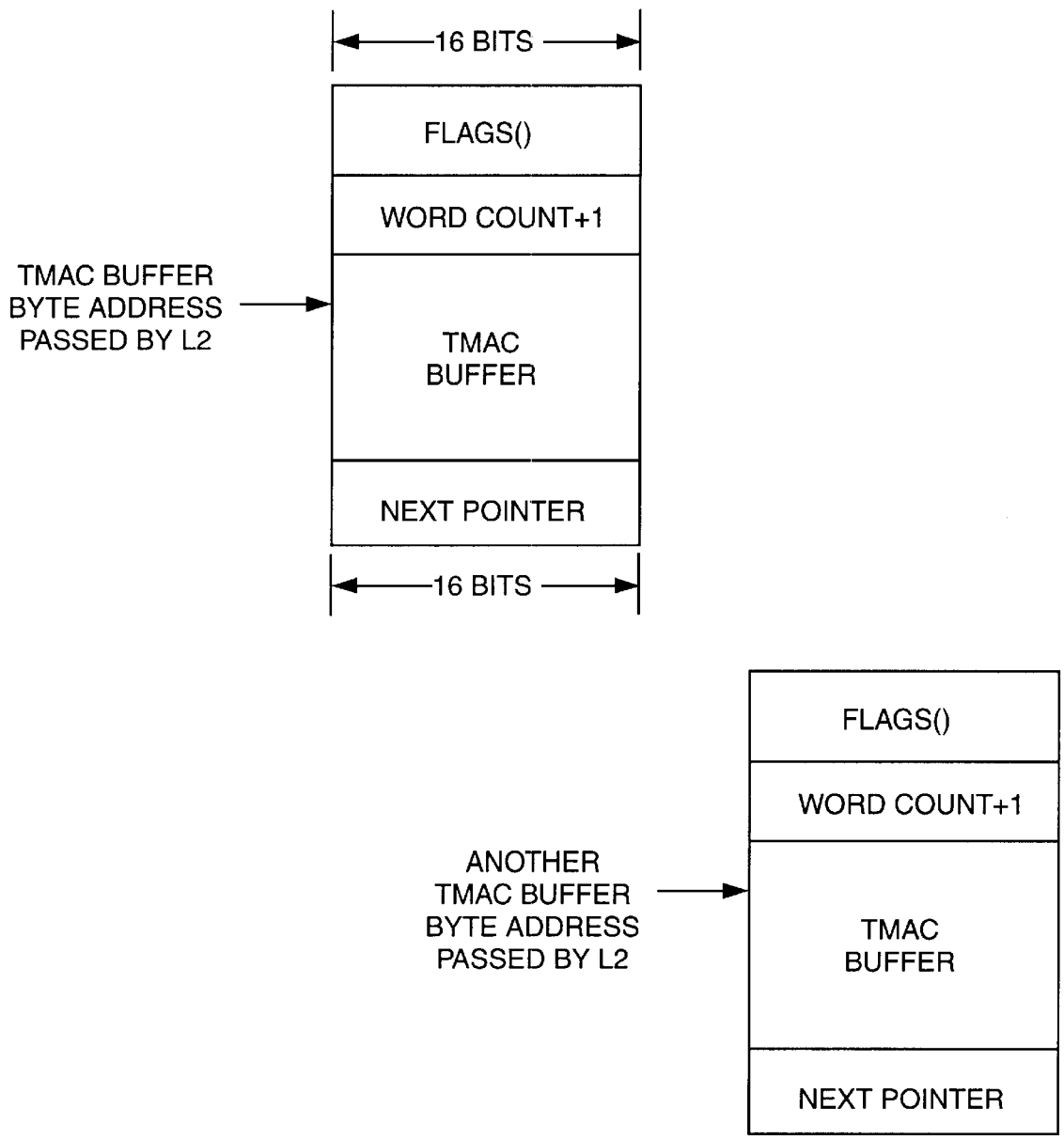
FIG. 6 is a diagram showing the structure of the TMAC Buffers of FIG. 4.

The TMAC buffers, shown in FIG. 6, are handled by the TMAC-to-TCB/RMAC-to-RCB Handler. As they are provided to the Streamer via a TMAC buffer address, a Header/Trailer will be built around the TMAC Buffer. TMAC buffers can be scattered in memory within the channel area. Little Endian byte orientation will be used for compatibility with both the Mwave and Intel conventions. Note that this Header/Trailer is reserved for use by the Streamer task.

RMAC Buffer

Figure 7:
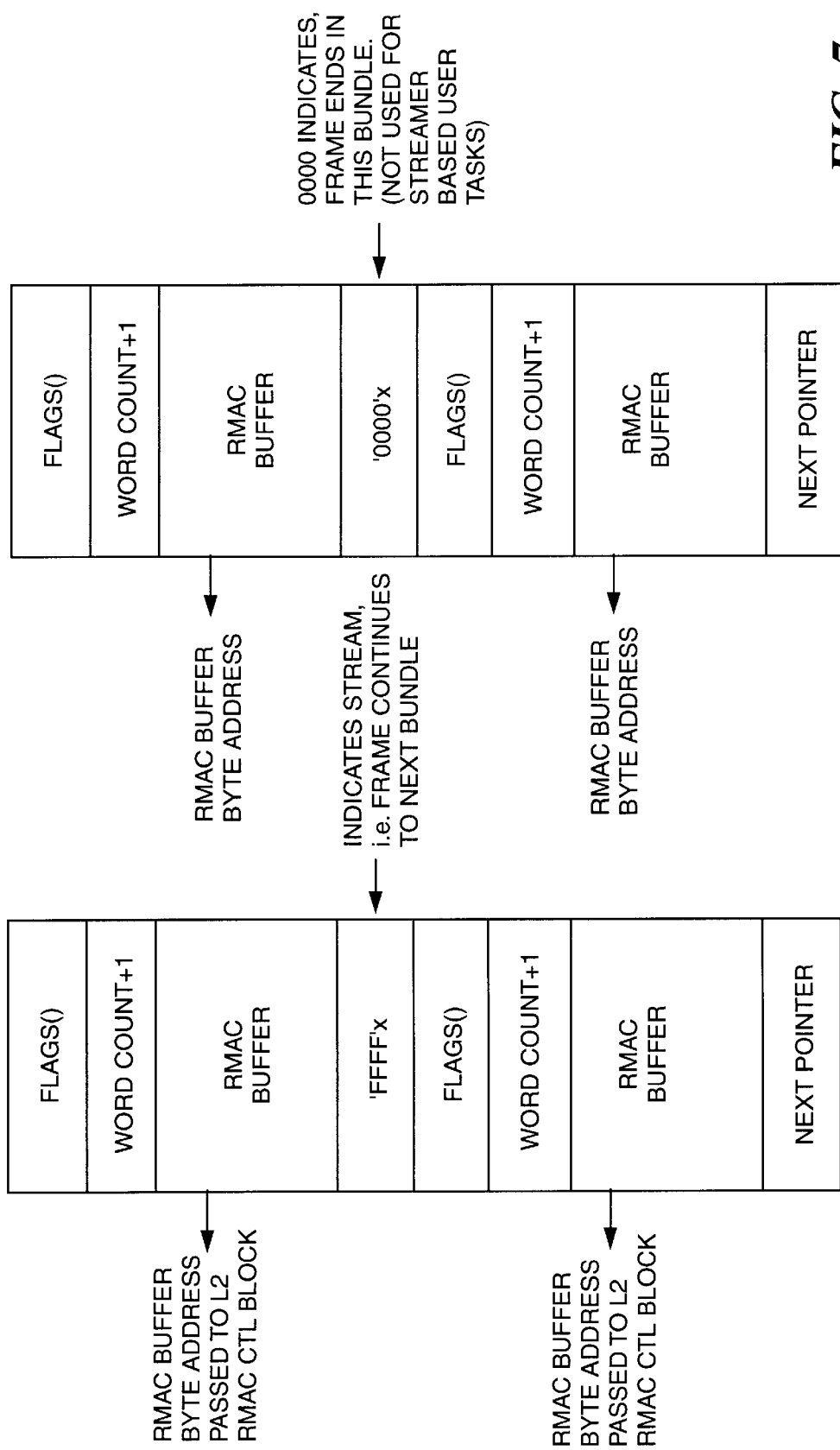
FIG. 7 is a diagram showing the structure of the RMAC Buffers of FIG. 4.

The RMAC buffers, shown in FIG. 7, are handled by the Streamer task. They are built within the Rbuff buffer area under full control of the Streamer task. They will be contiguous and of variable length in order to utilize memory efficiently.

FLEX Rx Threshold (rbufthr)

Figure 8:
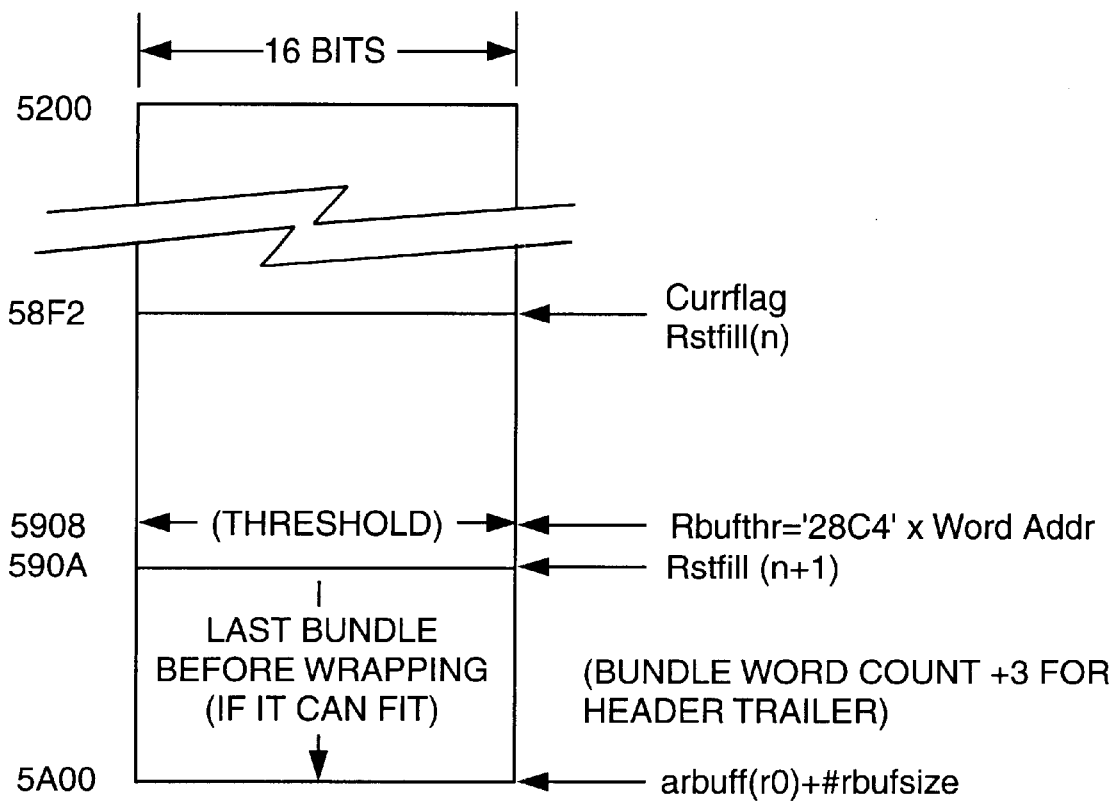
FIG. 8 is a diagram showing the structure of the Flex Rx Threshold.

The RMAC end of buffer threshold rbufthr mechanism allows the use of table addressing and avoids circular buffer handling overhead. This concept is very important for receive bundling. Note that the Rbufthr threshold is dynamically calculated at the beginning of each Rx bundle and will be based on the bundle Size+"thrx", a threshold constant. The Flex Rx threshold is shown in FIG. 8.

User Task Control Information Stream

In Band Streams Management Function

Any required control information, from the Host AIX application to the User DSP task, will be passed through the data stream via the GPC (general purpose connector) to be interpreted by the user task's streams interpreter. A play/record interface on AIX can be used to pass code commands that the DSP user task can interpret for use by DSP tasks such as DTMF that require any control information.

PCB based Streams Management Function

Initially there is no need for a separate control stream on the WAN driver 80 with a Protocol Control Block (PCB) based ITCB interface on the DSP. However, such a control method is described below:

- A PCB provides a channel number (one of the 128 Internal Channels) and 6 Words.
- The WAN driver 80 issues a PCB via the CHIC. Each PCB has a unique type (Control word). An Event field is user defined.
- Based on the content of the control word, the PCB handler on the DSP calls a User routine provided by the User DSP task.
- PCB words are copied to a private area and the User DSP task performs the desired function.
- A PCB interrupt can return results based on the command (e.g. Pass/Fail).

Page Based Memory layouts

16 Channel DSP Task Memory layout (128 per Card)

FIG. 10 shows how a 16 channel solution is mapped. There will be six (6) DSR8 pages with three channels per page. All three instances of the streamer BIOS data will be located at the top of the page, as shown in FIG. 9. This allows full flexibility for the User task to allocate memory. For example, the GPCs may all be placed at the bottom of the page to accommodate the modulo 2**n circular buffer boundary requirements.

Note that only 15 channels per DSP will be utilized for the 120 channel G.S.M. solution. Note that the 256 sample GPCs will be packed into 128 word GPCs in Global Memory. 64 TDM unidirectional time-slots will be available. One 128 word buffer will be allocated for each transmit or receive time-slot.

VOICEMODE

VOICEMODE will define Voice Task Operation Modes. The WAN driver 80 will be able to select these functions on a "per DSP" basis. A default value can be set in the Data File for linking. VOICEMODE will be located at 0228x in the DSP Data RAM of each DSP.

VOICEMODE—Pass Through Options:

'xxxx,xxxx,xxxx,x000' --- Voice Task i.e. No Pass Through. (DEFAULT)
'xxxx,xxxx,xxxx,x001' --- Pass Through with No Decode.
'xxxx,xxxx,xxxx,x010' --- (reserved)
'xxxx,xxxx,xxxx,x011' --- Pass Through with Decode uLaw.
'xxxx,xxxx,xxxx,x100' --- (reserved)
'xxxx,xxxx,xxxx,x101' --- (reserved)
'xxxx,xxxx,xxxx,x110' --- (reserved)
'xxxx,xxxx,xxxx,x111' --- Pass Through with Decode ALaw.

VOICEMODE—Loop Back Options:

'xxxx,xxxx,xx00,xxxx' --- No LoopBack
'xxxx,xxxx,xxx1,xxxx' --- Streamer Loopback
'xxxx,xxxx,xx1x,xxxx' --- GSM Voice Loopback

LOADCHAN & LOADCHDV

These global variables are used as follows:

LOADCHAN == Max# Channels per Load (Adapter)
LOADCHDV == Max# Channels per DSP

LOADTYPE

The global LOADTYPE variable is used as follows:

LOADTYPE='0000'x   = Generic:
LOADTYPE='0020'x   = SPN        (8 Device)
LOADTYPE='0040'x   = ORCA       (2 Device)
LOADTYPE='0080'x   = SPN256     (8 Device)

B. SPN256 WAN Driver

General

All Host Processor (ARCTIC 960) applications will interface to the SPN256 adapter 10 via the WAN driver 80 residing on the ARTIC960 PCI adapter 4. This WAN driver 80 is a modified version of the WAN driver used by the ARTIC960 4-Port T1/E1 Mezzanine Card adapter.

Certain routines in the WAN Driver 80 provide the following operations:

1. W_SETCH_MAP is used to set DSP channels to SNIDs and Timeslots.
2. W_GETCH_MAP is used to return the status of the mapping.
3. Channel/Port (DSP) assignment is done by a Higher Layer, such as from the Host system, or by the WAN driver 80 for Default load balancing.
4. A channel mapping function 84 controls the SC4000 TDM data channel selection.

All 16 SC-Bus ports (0:15) of the SC4000 are used for data. Data types include fax data, voice data, computer data, control data, ISDN data, voice, fax, modem, cellular data, or other type of data. Different communication protocols are supported, such as ISDN framing, GSM voice, GS327 voice, EV17 fax protocol, and other communication protocols.

In particular, the Channel/Port (DSP) assignment for load balancing allows different DSP configurations on the adapter card 10 to optimally handle various tasks, or channels, for communicating data streams across the at least one DSP on the adapter card 10. The WAN driver 80 coordinates with the SPIF operating system to assign tasks to each of the at least one DSP. The channels communicating data are distributed as tasks over the at least one DSP in the adapter card 10 to balance loading of task processing requirement, typically specified in MIPs, and the available processing capacity of each of the at least one DSP.

In the preferred embodiment, each DSP processing one or more tasks, or channels communicating data, is modelled by a load table, as shown by the exemplary table illustrated in FIG. 12. The processing capability of each task to be assigned to a DSP is modelled by a MIP/Task table as shown in an exemplary table illustrated in FIG. 13. Further, the maximum DSP processing capability is modelled by a DSP/MIP table, as shown in an exemplary table illustrated in FIG. 14.

Figure 15:
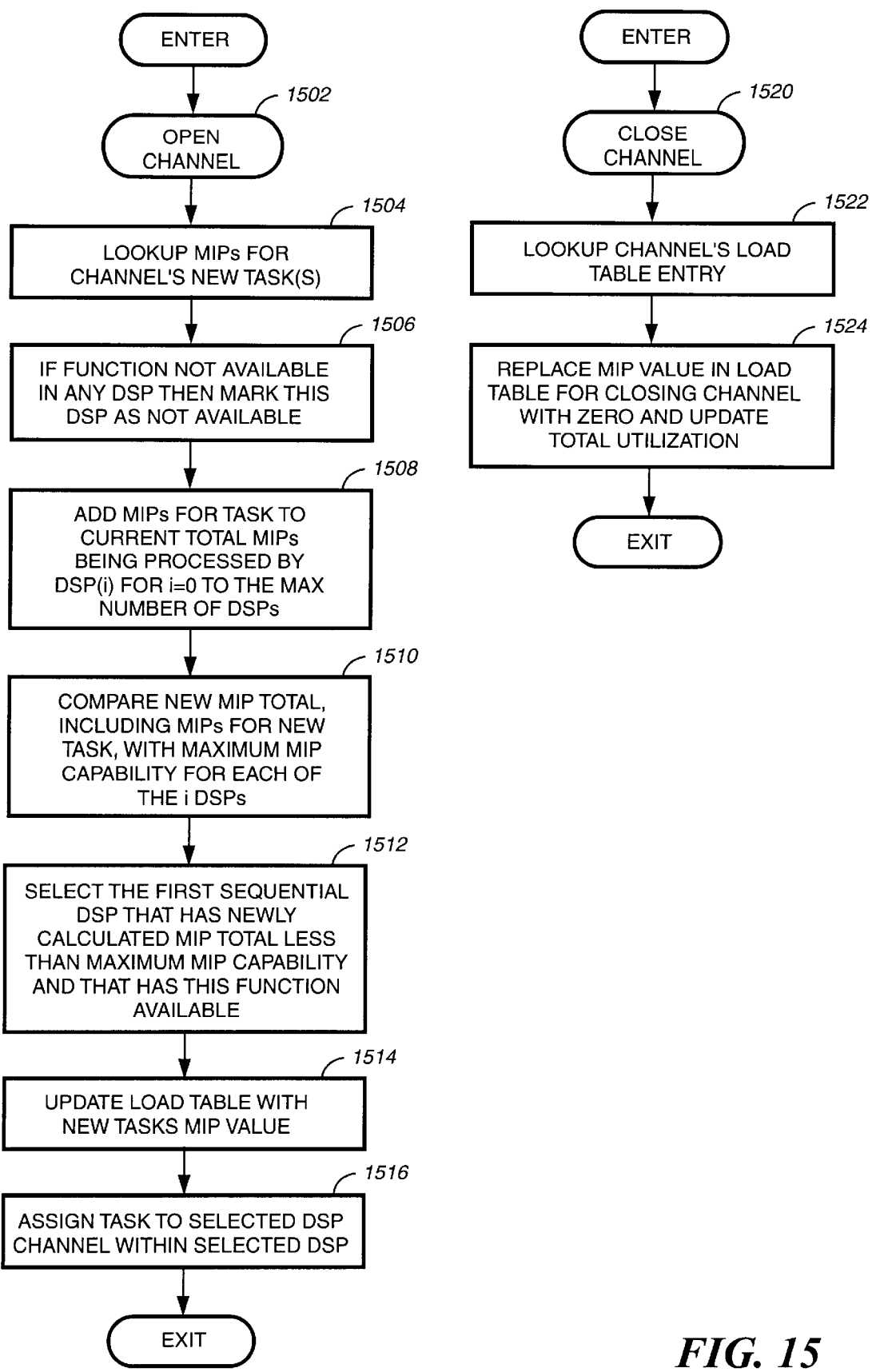
FIGS. 15, 16, and 17, are flow diagrams showing operational flow sequences according to a preferred embodiment of the present invention.

An exemplary operational sequence, as illustrated in FIG. 15, shows the WAN driver 80 operations for handling load leveling of tasks and distributing tasks over the at least one DSP in the adapter card 10 to make best use of the available processing capability of each of the at least one DSP in the adapter card 10.

According to the exemplary operational sequence shown in FIG. 15, the WAN driver 80 begins opening a new channel, i.e., assigning a new task for communicating data to one of the at least one DSP, at step 1502 by receiving from a host a request to open a new channel. The request identifies the task necessary to handle the communication protocol and data hadling requirements across the new channel. The WAN driver 80, at step 1504, performs a look-up in the MIP/Task table shown in FIG. 13 to retrieve a MlP/task value as predefined in the MIP/Task table. This value is a model of a required MIP processing for a communication task for handling the new channel on a DSP.

The WAN driver 80 then, at steps 1506, 1508, and 1510, accumulates the total current MIPS being handled for all current tasks by each of the at least one DSP to determine a current MIP processing total being handled by each of the at least one DSP, and then attempts to increment each of the MIP totals with the new task MIP requirements. In this way, the WAN driver attempts to select a DSP that can handle the new task MIP requirements without exceeding the DSP's maximum MIP capability as predefined in the DSP/MIP table shown in FIG. 14.

When a DSP is determined to be capable of handling the additional MIP processing requirements of the new task, the WAN driver 80 selects a DSP and assigns the new task to the DSP that is capable of handling the additional MIPs processing for the task. The load table shown in FIG. 12 is updated for the DSP by adding the new task MIP requirements to the selected DSP list of tasks (each indicated by a channel MIPs required column in the row for the selected DSP) that are being handled by the selected DSP.

As tasks are completed, and channels are closed, the load table is updated to remove the completed task (MIPs requirement) from a list of current tasks being handled by a DSP. This then frees up MIPs for the DSP to handle additional new tasks as they are requested by the host. In this way, the WAN driver 80 dynamically allocates and de-allocates tasks to each of the at least one DSP to distribute task processing requirements across the at least one DSP in the adapter card 10. This makes optimal use of the available processing capability of the at least one DSP at all times. The dynamic allocation of processing requirements across the at least one DSP is a significant feature of the WAN driver 80 that is not found in any known prior art communication systems.

WAN driver time Slot Mapping via SNID

Each Unix Stream will have an ID referred to as a Sub-Network ID or SNID. (This terminology is borrowed from the Spider protocol stack code from Shiva). Each SNID is a 32 bit number and has two optional formats. With the "decode on" option the SNID has the Format specified in the "IBM ARCTIC 960 Streams Support WAN driver Interface Functional Specification." With the "decode off" option the SNID is a singular value.

The W_SET_SNID is used to tie an Internal Channel to each SNID. Information regarding DSP Channel and SC Local Port Number are also provided to the WAN driver 80. Also W_REL_SNID will release the SNID and W_GET_SNID will get information related to the SNID.

The W_SETCH_MAP WAN driver command will map a DSP channel to an appropriate SC bus line and timeslot. There will be up to 16 Channels per DSP with 8 DSPs.

WAN driver SC-Bus Control: Definitions

Figure 11:
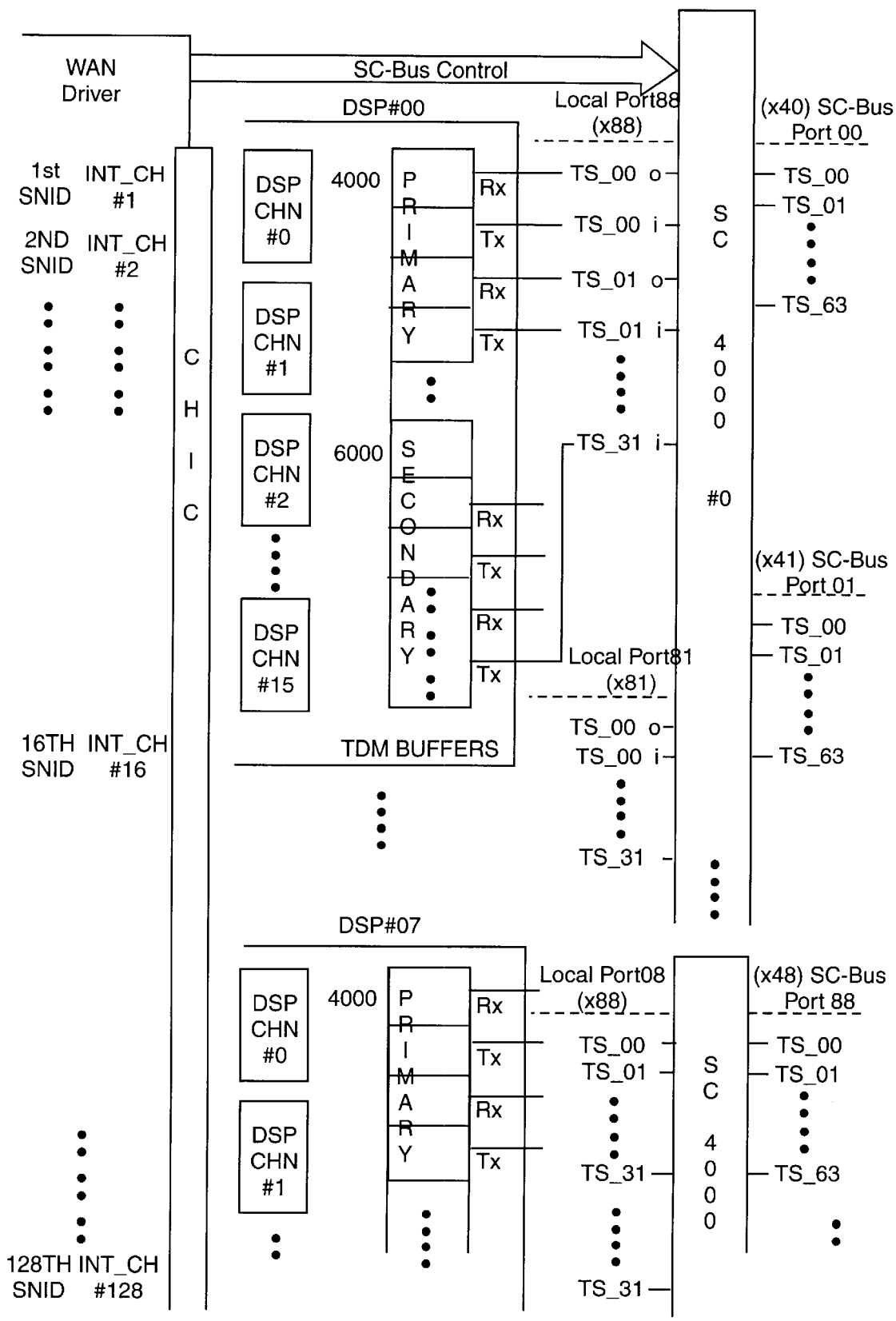
FIG. 11 is a diagram showing the TDM port use.

FIG. 11 is a conceptual diagram of the SC-Bus control by the WAN driver 80. The following definitions apply:

WAN Driver API Definitions

| | | |
|---|---|---|
| SNID# | Network ID passed from WAN driver (a 32 bit #) user. | |
| Internal Channel# | WAN driver Internal Logical channel | (01:128) |
| SAP# | Internal channel-1. | (00:127) |

CHIC API Definitions

CHIC Channel#

Used to select DSP# and DSP channel# (00:127). CHIC is passed an 8-bit CHIC channel number from the WAN driver 80.

CHIC uses LOADTYPE to keep one unified version of CHIC.

WAN driver 80 mapping to CHIC channel

The WAN driver 80 will be given a Port# and DSP channel. (This DSP channel has a corresponding timeslot on the local SC-bus port).

The WAN driver 80 will find the DSP# corresponding to the Port#, and multiply it by N (N=16 for SPN256) and add the DSP Channel# (0:15) to derive the CHIC channel#.

Example: N=16, Local Port#1 (2nd DSP). DSP Channel#2 (3rd DSP Channel)

CHIC Channel#=((1*16)+2)=18. (19th channel)

Note that the 16th DSP channel is skipped.

MODULO(N) Algorithm: CHIC will use the following Algorithm to translate a CHIC Channel # to one of the N corresponding channels per DSP:

CHIC, via the DSP code LOADTYPE, will find "N" for this adapter. N equals the number of DSP Channels per DSP. For SPN256, LOADTYPE='0080'x & N=16.

To find DSP#: DSP#==TRUNC{CHIC_Chan#/N}

To find DSP_CH#: DSP_CH#==REM {CHIC_Chan#/N}

Example: N=16, CHIC_Channel#=18

TRUNC {18/16}=1 (use DSP#1)

REM{18/16}=2 (use DsP_Channel #2)

DSP API Definitions:

DSP Channel #: One of up to 16 channels per DSP (00:15). For current projects only up to 15 channels/DSP are needed:

| | |
|---|---|
| G.S.M. | 15 channels/DSP |
| Conferencing | 15 channels/DSP = (Inc.) Control Chn) |
| Low speed Modem | 15 channels/DSP |
| High speed Modem | 2 channels/DSP |

DSP #: One of 8 DSPs per SPN256 Mezzanine card. (00:07)

DSP Time-Slot Pair: Tx and Rx TDM buffer Pair in DSP Dram (00:31). Each DSP will have 16 Primary TS pairs and 16 secondary pairs for conferencing type functions.

DSP Time-Slot Groups: The Time-slots will be put into "Time-slot Groups." TS will be split 50/50 for Tx and Rx (16+16 for transmit, and 16+16 for receive).

SC4000 API Definitions

SC Local Port #—One of 8 Local SC4000 SC-bus ports (80:87). Each Local Port is fixed to a corresponding DSP#. Eg. DSP#0 connected to Port#80

SC Port #—One of 16 SC4000 SC-bus ports (40:4F).

SC Time-Slot #—One of 64 unidirectional SC-Bus (00:63). TimeSlots for each SC-bus port or (00:31) depending on SC speed (2.848 Mb/s–4.896 Mb/s).

NOTE—The Local Port# also Defines the DSP# due to Card Layout.

Operation of SC-Bus control commands relative to DSP

The operation of the following commands can be as follows:

W_SET_SNID:

WAN driver 80 user will pass SNID# and CHIC channel#. Note: CHIC Channel#=Port_ID (DSP#) combined with Chan_ID (DSP channel). The WAN driver 80 can concatenate these fields into one field for the CHIC channel#.

The W_SET_SNID function returns the Internal Channel# associated with the SNID# presented to the WAN driver 80. Here is an example of the W_SET_SNID operation:

| W_SET_SNID Input: | SNID | = abcd |
| --- | --- | --- |
| | Local Port | = x '80' |
| | T.S. # | = x '01' |
| W_SET_SNID Output | Internal CH# | = x 110' (Returned by the WAN driver 80) |

Note: the T.S.# within a Local Port# is referred to as "Channel".

NOTE: The T.S.# within a Local Port# is referred to as "Channel".

W_SETCH_MAP:

Set SC Time-Slot associated with the Channel. There are ten optional fields available. The Fields, passed by the WAN driver user, will indicate the SC-bus Port# and Time-Slot# that are to be associated with the internal channel#. (Note that the DSP Channel# in a DSP, and a WAN driver Internal Channel# are not necessarily related.) Today the MAP entry can either be specified as INT_CH# or (PORT# and T.S.#)

A 'Zero' entry will be defined as a "No Connect."
A '1' entry will be defined as a "Remain the same."
Ex. W_SETCH_MAP input:

| MAP | Rx | Tx |
| --- | --- | --- |
| Internal CH# | 40 | 45 |
| 10 | 5 | 20 |
| Port#, T.S.# | 45 | 45 |
| x80, x16 | 21 | 6 |
| Up to 10 entries . . . | | |

W_GETCH_MAP:

Gets the SC-Port and Time-Slot associated with the Internal Channel or SC-Local Port# and T.S.#. In the latter case, this can be done by reading the SC4000 control registers. In conferencing applications, typically the AIX application and the DSP code will decide how the mixing will occur. It should be transparent to the WAN driver 80 and to the CHIC. Further, each channel should get 4 scatter gather tasks—2 transmit and 2 receive.

CHIC/DSP Channel Numbering

We could set 15, 16, or 32 channels per DSP. We will define a 16 (N=16) channel MAP for each DSP.

DSP timeslot Groups (e.g. conferencing application)

For the GSM and such applications, there will only be one pair (Tx & Rx) of timeslots per SNID/Internal_chan/DSP_chan. In this case the DSP timeslot Group consists of one primary Tx and Rx T.S. pair. However, for conferencing applications there may be many (although initially there will be two pairs).

DSP timeslots are split into Primary and Secondary DSP channels (see FIG. 11). This can be extended to M equal sized groups of DSP timeslots for mixing of the M SC-Bus timeslots and for future applications.

```
MIXING:
                Time-Slot #1
                //              <--     W_SETCH_MAP
                //                      used to assign Primary
DSP Channel#1 ==<====(+)=<== Time-      and Secondary Times-
                Slot #2                 lot connections for
                                        Mixing (conferencing).
```

The extra W_SETCH_MAP fields are to indicate the additional SC Port & timeslots associated with this SNID/INT_Ch/DSP_Chan. For N Non-Zero entries, there will be N groups of DSP timeslots associated with the DSP channel/SNID/INT_Channel.

VOICEMODE VOICEMODE will define VOICE Task Operation modes. The WAN driver 80 will be able to select these function on a per DSP basis. A default value can be set in the Data File for linking. VOICEMODE will be located at 0228x in the DSP Data RAM of each DSP.

VOICEMODE—Pass Through Options:

'xxxx,xxxx,xxxx,x000' --- Voice Task i.e. No Pass Through. (DEFAULT)
'xxxx,xxxx,xxxx,x001' --- Pass Through with No Decode.
'xxxx,xxxx,xxxx,x010' --- (reserved)
'xxxx,xxxx,xxxx,x011' --- Pass Through with Decode uLaw.
'xxxx,xxxx,xxxx,x100' --- (reserved)
'xxxx,xxxx,xxxx,x101' --- (reserved)
'xxxx,xxxx,xxxx,x110' --- (reserved)
'xxxx,xxxx,xxxx,x111' --- Pass Through with Decode ALaw.

VOICE MODE—Loop Back Options:

'xxxx,xxxx,xx00,xxxx' --- No LoopBack
'xxxx,xxxx,xxx1,xxxx' --- Streamer Loopback
'xxxx,xxxx,xx1x,xxxx' --- GSM Voice Loopback

LOADCHAN & LOADCHDV

These global variables are used as follows:

LOADCHAN == Max# Channels per Load (Adapter)
LOADCHDV == Max# Channels per DSP

LOADTYPE

The global LOADTYPE variable is used as follows:

The global LOADTYPE variable is used as follows:

| LOADTYPE='0000'x | = Generic | |
| --- | --- | --- |
| LOADTYPE='0020'x | = SPN | (8 Device, 4 channels per device) |
| LOADTYPE='0040'x | = ORCA | (2 Device, 16 channels per device) |
| LOADTYPE='0080'x | = SPN256 | (8 Device, 15 channels per device) |
| LOADTYPE='0100'x | = TRAS | (8 Device, 2 channels per device) |

The DSP Adapter 10 as discussed above provides a flexible interface that can adapt to changes in applications and different data types. Further, the WAN driver 80 handles task allocation requests and assigns tasks corresponding to the requests across a plurality of DSPs to distribute the processing load of the tasks across the plurality of DSPs. This is a significant feature of the present invention that is not available in any known prior art communication system.

Another significant feature of the present invention is the ability to adapt its task allocation functions in accordance with changes in the configuration of the communication system and the DSP Resource Adapter. This feature will be discussed in more detail below. After a configuration of the system, for example, a configuration controller 92 typically will update available tasks and track each available task's processing requirements. The WAN driver 80 then can allocate the available tasks across any of a plurality of DSPs to distribute the processing load of the available tasks across the plurality of DSPs, as will be more fully discussed below.

DYNAMIC DSP LOAD BALANCING

The WAN driver can preferably be configured to support three DSP load balancing methods:

Application Directed
Round Robin
First Fit Load Balancing

Application Directed Load Balancing

In this method the application will specify which DSP channel will perform the desired DSP function. This is done via the W_SETCH_MAP function.

First the W_SET_SNID is used to associate a WAN Driver Internal channel number -to- the SC Bus Local port and Timeslot (e.g. CHIC Channel number). A SNID is also associated with this pair. FIG. 11 shows how the CHIC channel number relates to which DSP is used. The CHIC channel number is directly related to the DSP channel number.

Second, the W_SETCH_MAP will MAP a DSP channel to an appropriate SC Bus TDM port and Timeslot. It does this by associating the SC Bus Main Port and Time Slot -to- the CHIC Channel number hence the DSP channel number for direct application control.

Round Robin Load Balancing

In this method the WAN driver allocates which DSP channel will perform the desired DSP function by alternating between each of the i DSP processors as channels are opened.

In this case, the W_SET_SNID is used to associate the internal channel of the WAN driver to the SNID. The SC Bud Local Port and timeslot (Hence DSP used) is returned to the user by the WAN driver. Hence the WAN driver has control of which DSP channel is used.

First Fit Load Balancing

In this method a set of tables are used to determine the optimal allocation of functions accross the i DSP's. As in Round Robin Load balancing the WAN driver controls the DSP Channel used.

The operation is very analogous to the First Fit Algorithm used for memory management (See Tanenbaum, pp. 337). In the memory management case, the fragmentation of memory is avoided. The same concept is applied to Processing power i.e. MIPs (Million Instruction Per second) where a MIP intensive (i.e. large) tasks need a larger portion of the DSP processing capability. FIG. 13 shows how various task are assigned a MIP rating. This table is maintained in coprocessor memory and there can be one for each available DSP in the sub-system. The MIP rating can be determined in the DSP task developer's laboratory by testing the function under "worst case" conditions. Also note that each of the DSP processors may have different performance capability. A table is configured by the user when the system is installed.

FIG. 15 shows the operation for allocation DSP channels for each function channel to be performed. As a particular task is to be initiated, by the application for a channel, the WAN will lookup the MIPs (processing load) required for the Task using a table as shown in FIG. 13. (See 1502, 1504, 1506). If this task is not currently present in a particular DSP table then this DSP is not chosen. Further if no DSP has this function available in the current DSP code load then request to open the channel is rejected by the WAN driver. However, if available the MIP value for this task is added to the total number of MIPs being utilized by each DSP in the Load Table shown in FIG. 12. (see step 1508). Then the MIP total is compared to each of the DSPs maximum MIP capability using the MIP per DSP table in FIG. 13. The FIRST sequential DSP that can perform this new task is selected and the Load Table is updated. (See 1510, 1512, and 1514). Then the Local Port and Timeslot associated with the DSP channel is returned via the W_SET_SNID (1516). If none of the DSP's can support the new channels task the request is rejected with a fail return code.

Note that the first fit algorithm could be modified, or other algorithms, could be used according to specific application requirements. For example, certain DSP's may be better suited for certain types of applications than others.

MIP Processing Metric

An example of a metric used for processing load is MIPs which represents the number of millions of instructions per second that are required by a processing operation. A tasks MIP requirement can be defined differently for Real Time Tasks and for Non Real Time Tasks.

A Non Real Time task runs in the background and does not have any critical timing requirements. It is dispatched in a round robin scheduling method. An example of this would be a Protocol Task. These tasks would have large input and output queues to allow for any statistical fluctuation as they are dispatched. For these tasks the MIP metric is typically used.

Real Time tasks run in the foreground and are dispatched at a periodic rate. For these tasks the scheduling frequency -or- frame time is typically specified along with the number of cycles per frame. In discussions herein the MIP metric is equivalent to and can be derived from a frame time (dispatch period) and cycles per frame time metric.

If the DSP resource contains DSP's with different architectures then these would require a different task module even for an identical function. For example, both general purpose and VLIW (Very Long Instruction Word) architecture DSP's may be available in the same PMC adapter.

Dynamic DSP Task Requirement Configuration

The system, preferably the WAN driver, will contain a configuration controller 92 for handling dynamic configuration as discussed below.

Figure 16:
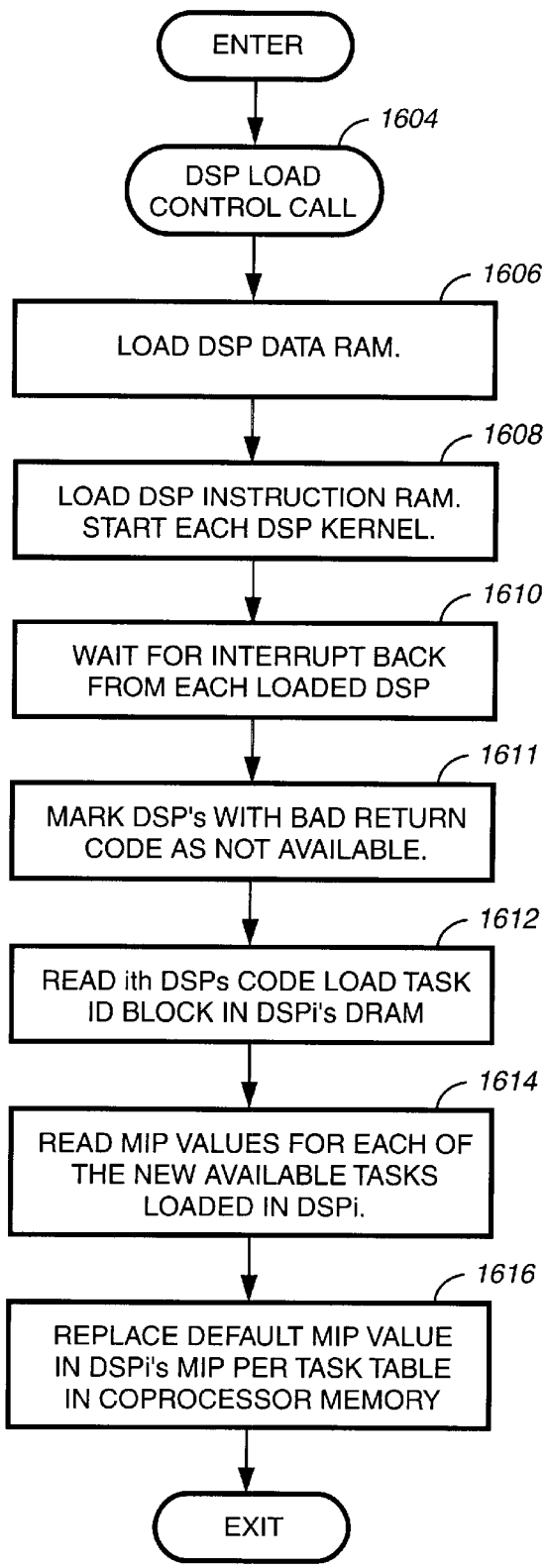

Instead of the user building the MIP per Task table of FIG. 13, which would be fixed lacking flexibility required for having different DSP code modules loaded onto each DSP, or for supporting DSP tasks (i.e. algorithms) provided by various DSP Firmware vendors as code is optimized in future releases, or as different functions are provided for the different user's of the DSP based sub-system, FIG. 16 shows how the MIP Per Task table in FIG. 13 can be built dynamically as the specific DSP tasks are loaded into the DSP processor's memory.

Block 1604 will read the DSP code being loaded for a particular DSP. In the preferred embodiment this code load is bound to the WAN river and is the same for all DSP's. However, in other embodiments the ode load may reside on the system hardfile for example. Also, each DSP may be loaded with different DSP code modules.

Block 1606 and 1608 will load the Harvard Architecture Data and instruction RAM and start the core DSP kernel of each of the DSP processors. An interrupt with successful status is generated back to the WAN driver after the start of each DSP and in block 1610 the WAN driver waits for good return code of each DSP. If the DSP returned a failing return code -or- none at all, this DSP is marked as not available with an empty MIP per Task Table in 1611. Block 1612 shows the step where the WAN will locate a Matrix within the DSP code loaded onto the DSP that contains the list of functions or tasks and associated MIP requirements. This table can be in a predetermined location in each DSP processors Data Memory. In 1614 this information is read from the current MIP per Task Table and then these values are updated into the table of FIG. 13 in step 1616.

In the current embodiment the DSP code module contains all the functions or tasks in one unit. All functions needed are contained and no dynamic task swapping is required. Special DSP modules can be composed for a specific customer application -or- a generic DSP module can be available for many customers. However, this invention is not limited to DSP modules with all functions bound and could apply to the case where the Functions are separate and loaded on each DSP.

Also note that in the current embodiment the Task information is read after the Code has been loaded onto the DSPs. However, in some systems the task information may be updated after the code is loaded onto the Coprocessor from the system unit 2, but before loaded onto the DSP's. Optionally, a DSP design may have limited DSP memory and force tasks to be loaded and unloaded onto the DSP from the Coprocessor 4 as they are to be executed.

Dynamic DSP Capability Configuration

Figure 17:
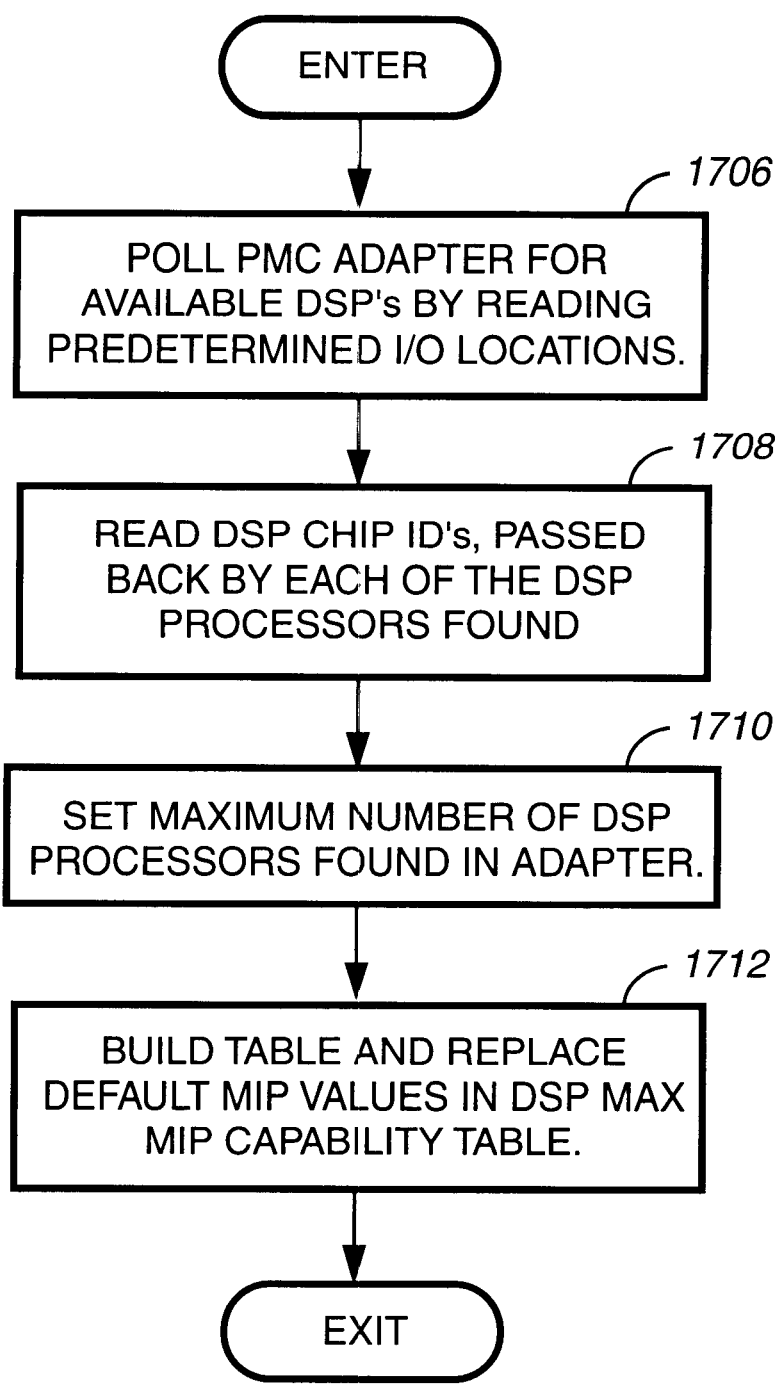

The configuration controller 92 will also perform dynamic configuration to support different hardware PMC adapters and DSP processors with varying capabilities. Instead of the user building the DSP MIP Capability table of FIG. 14, which would require specially trained field engineers, FIG. 17 shows the steps how this is performed automatically by the system, typically after new DSP resource adapters, with updated technology, are installed -or- when a system configuration is required.

The WAN driver, after being loaded, will poll the PMC adapter for all available DSP processors connected to the PMC (PCI Mezzanine Card) connector. (See 1706). In the preferred embodiment, each DSP has it's own PCI bus and has it's own PCI Bus device ID. (See 48 in FIG. 3) Then in 1708, the WAN driver will read a predetermined location in each PCI devices Memory, to determine the DSP CHIP Identification (ID). This identification is used to determine the MIP capability of each DSP.

As described in FIG. 15 the updated DSP MIP Capability table is used with the MIP per Task Table in FIG. 13 to allocate tasks onto one of several DSP processors of a multiprocessor DSP sub-system.

Alternatively to reading a DSP CHIC ID, the configuration controller 92 may first download and run a diagnostic program on each DSP which will generate and return a quality factor to determine the MIP capability of the DSP.

In the preferred embodiment the configuration controller 92 will perform the Dynamic DSP Capability Configuration according to FIG. 17 before the Dynamic DSP Task Requirement Configuration according to FIG. 16.

Information related to specific DSP's being used in the system may not be limited to the processing power -or- MIPs. Other resource needs and requirements such as the amount of Data RAM (DRAM) and Instruction RAM (IRAM), may be configured per task. Also, the amount of memory installed may be polled by the WAN driver during system configuration as is done with MIPs in FIG. 15. In addition, combinations of requirements, such as Memory and MIPs, may be applied to the process of FIG. 15.

Although specific embodiments of the invention have been disclosed, it will be understood by those having skill in the art that changes can be made to these specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A communication system comprising:
   at least one digital signal processor ("DSP") in a DSP Resource Adapter;
   a processor electrically coupled to the at least one DSP and to a memory, the memory including a task processing loading table containing one or more values corresponding to current task processing load for each of the at least one DSP;
   a wide area network device driver ("WAN driver") coupled to the processor and being responsive to the one or more values for handling allocation of tasks across the least one DSP to distribute task processing loads across the at least one DSP according to a total current task processing load for each of the at least one DSP, a maximum processing capability for each of the at least one DSP, and a processing requirement for a task being allocated to one of the at least one DSP that can handle the additional processing load of the task being allocated; and
   adaptive configuration tracking means for storing the values in the task processing loading table in accordance with a change in configuration of the communication system.

2. The communication system as recited for claim 1, wherein the adaptive configuration tracking means keeps track of task processing requirements for each task available to be allocated across the at least one DSP.

3. The communication system as recited for claim 1, wherein the adaptive configuration tracking means keeps track of maximum processing capability for each of the at least one DSP.

4. The communication system as recited for claim 1, wherein the adaptive configuration tracking means comprises a task processing requirement table in the memory, and wherein the adaptive configuration means updates the task processing requirement table in the memory in response to a change in configuration of the communication system.

5. The communication system as recited for claim 4, wherein the change in configuration of the communication system comprises a change in the tasks that are available for allocation across the at least one DSP.

6. The communication system as recited for claim 4, wherein the change in configuration of the communication system comprises a change in the maximum processing capability for one of the at least one DSP.

7. The communication system as recited for claim 1, wherein the WAN driver updates the task processing loading table to keep track of the current total processing load of each of the at least one DSP according to a processing requirement of at least one task currently allocated to the at least one DSP, and wherein the processing requirement of the at least one task is determined by the adaptive configuration tracking means.

8. A communications controller for interfacing between a system unit comprising a system processor, and a Peripheral Component Interconnect Mezzanine Card ("PMC") comprising a plurality of digital signal processors ("DSPs") and a time division multiplexing ("TDM") interface for connecting to external devices, the communications controller comprising:

a bus;

a processor, coupled to the bus;

a memory device, coupled to the processor;

a Peripheral Component Interconnect ("PCI") bus system, coupled to the processor;

a PCI-PMC connector, for connecting the controller to the PMC, coupled to the PCI bus system;

a system unit connector, for connecting to the system unit, coupled to the PCI bus system; and a driver, wherein the driver comprises:

means for supplying an Application Programmer's Interface ("API") for interfacing to the system processor;

means for handling task allocation requests for the plurality of DSPs from the system processor;

task allocation means for allocating at least one task to one of the plurality of DSPs according to a MIPs processing requirement of the at least one task and the available processing capability of the one of the plurality of DSPs in response to a task allocation request; and configuration tracking means for keeping track of 1) the MIPs processing requirement of each of the at least one task available for allocation across the plurality of DSPs, and 2) the maximum processing capability of each DSP of the plurality of DSPs, in accordance with a change in configuration of at least the Peripheral Component Interconnect Mezzanine Card.

9. The communications controller according to claim 8, wherein the change in configuration comprises a change in the tasks that are available for allocation across the plurality of DSPs.

10. The communications controller according to claim 8, wherein the change in configuration comprises a change in the maximum processing capability for at least one of the plurality of DSPs.

11. The communications controller according to claim 8, wherein the change in configuration comprises a change in a total number of DSPs in the plurality of DSPs.

12. The communications controller of claim 8, wherein the means for supplying an API comprises means for routing time slots on the TDM interface of the PMC to the plurality of DSPs on the PMC, and wherein the routing means configures multiple time slots to be routed to any one of the plurality of DSPs, each time slot constituting a communication channel, or task, being handled by the one of the plurality of DSPs.

13. The communications controller of claim 12, wherein the routing means supports conferencing applications by routing multiple transmit and receive time slots to any one of the plurality of DSPs.

14. A method for a communications system that includes a plurality of digital signal processors ("DSPs"), the method comprising the steps of:

receiving task allocation requests for tasks that handle communication channels in the plurality of DSPs;

allocating tasks to each of the plurality of DSPs, in response to receiving the task allocation requests, to handle communication channels across each of the plurality DSPs and to distribute task processing loads across the plurality DSPs according to a total current task processing load for each of the plurality of DSPs, a maximum processing capability for each of the plurality of DSPs, and a processing requirement for each of the tasks being allocated to each of the plurality of DSPs that can handle the additional processing load of each of the tasks being allocated; and keeping track of 1) the million instruction per second ("MIPs") processing requirement of each task of the at least one task available for allocation across the plurality of DSPs, and 2) the maximum processing capability of each of the plurality of DSPs, in accordance with a change in configuration of at least a Peripheral Component Interconnect Mezzanine Card.

15. The method according to claim 14, wherein the change in configuration comprises a change in the tasks that are available for allocation across the plurality of DSPs.

16. The method according to claim 14, wherein the change in configuration comprises a change in the maximum processing capability for at least one of the plurality of DSPs.

17. The method according to claim 14, wherein the change in configuration comprises a change in a total number of DSPs in the plurality of DSPs.

* * * * *